United States Patent
Verheijen et al.

(10) Patent No.: US 12,508,938 B2
(45) Date of Patent: Dec. 30, 2025

(54) METHODS AND SYSTEMS FOR ALLOCATING CHARGING RESOURCES TO ELECTRIC VEHICLES

(71) Applicant: GreenFlux Assets B.V., Amsterdam (NL)

(72) Inventors: Lennart Frans Verheijen, Amsterdam (NL); Dzmitry Kuhach, Amsterdam (NL); Raman Tsitou, Amsterdam (NL)

(73) Assignee: GreenFlux Assets B.V., Amsterdam (NL)

( * ) Notice: Subject to any disclaimer, the term of this patent is extended or adjusted under 35 U.S.C. 154(b) by 168 days.

(21) Appl. No.: 18/003,401

(22) PCT Filed: Jan. 13, 2022

(86) PCT No.: PCT/NL2022/050007
§ 371 (c)(1),
(2) Date: Dec. 27, 2022

(87) PCT Pub. No.: WO2022/158968
PCT Pub. Date: Jul. 28, 2022

(65) Prior Publication Data
US 2023/0347782 A1    Nov. 2, 2023

(30) Foreign Application Priority Data
Jan. 20, 2021   (NL) .................................... 2027353

(51) Int. Cl.
*B60L 53/67*       (2019.01)
*B60L 53/63*       (2019.01)
*B60L 53/68*       (2019.01)

(52) U.S. Cl.
CPC ............. *B60L 53/67* (2019.02); *B60L 53/63* (2019.02); *B60L 53/68* (2019.02); *B60L 2240/70* (2013.01)

(58) Field of Classification Search
CPC .......... B60L 53/67; B60L 53/63; B60L 53/68; B60L 2240/70; B60L 53/305; Y02T 10/70; Y02T 10/7072; Y02T 90/12
See application file for complete search history.

(56) References Cited

U.S. PATENT DOCUMENTS

| | | | | |
|---|---|---|---|---|
| 2012/0146583 | A1* | 6/2012 | Gaul | H02J 3/322 |
| | | | | 320/109 |
| 2015/0352971 | A1* | 12/2015 | Bianco | B60L 53/665 |
| | | | | 307/9.1 |

FOREIGN PATENT DOCUMENTS

| | | |
|---|---|---|
| DE | 102013205496 A1 | 10/2013 |
| JP | 2013141360 A * | 7/2013 |

(Continued)

OTHER PUBLICATIONS

International Search Report and Written Opinion for corresponding International application No. PCT/NL2022/050007; dated May 20, 2022 (14 pages).

*Primary Examiner* — Santosh R Poudel
(74) *Attorney, Agent, or Firm* — MENDELSOHN DUNLEAVY P.C.; Kevin J. Dunleavy; Steve Mendelsohn

(57) ABSTRACT

A method for providing charging resources to one or more electric vehicles is disclosed. The method comprises a control system of an electric vehicle supply equipment, EVSE, storing a default charging profile. The default charging profile defines a first maximum amount of charging resources that the EVSE may provide to one or more electric vehicles charging with the EVSE. The method also comprises the control system of the EVSE receiving from a central control system, via a communication connection between the control system and the central control system, a charging profile. The charging profile defines a second maximum amount of charging resources that the EVSE may provide to one or more electric vehicles charging with the (Continued)

EVSE. The method also comprises the control system effectuating the received charging profile. This comprises causing the EVSE to provide at most the second maximum amount of charging resources to one or more electric vehicles charging with the EVSE. The method also comprises the control system determining that the communication connection between the control system and the central control system is broken and, based on this determination, the control system effectuating the default charging profile comprising causing the EVSE to provide at most the first maximum amount of charging resources to the one or more electric vehicles charging with the EVSE.

16 Claims, 12 Drawing Sheets

(56) References Cited

FOREIGN PATENT DOCUMENTS

| | | |
|---|---|---|
| JP | 2017-46398 A | 3/2017 |
| WO | 2010120551 A1 | 10/2010 |
| WO | 2011009129 A1 | 1/2011 |
| WO | 2012149965 A1 | 11/2012 |
| WO | 2020104326 A1 | 5/2020 |

\* cited by examiner

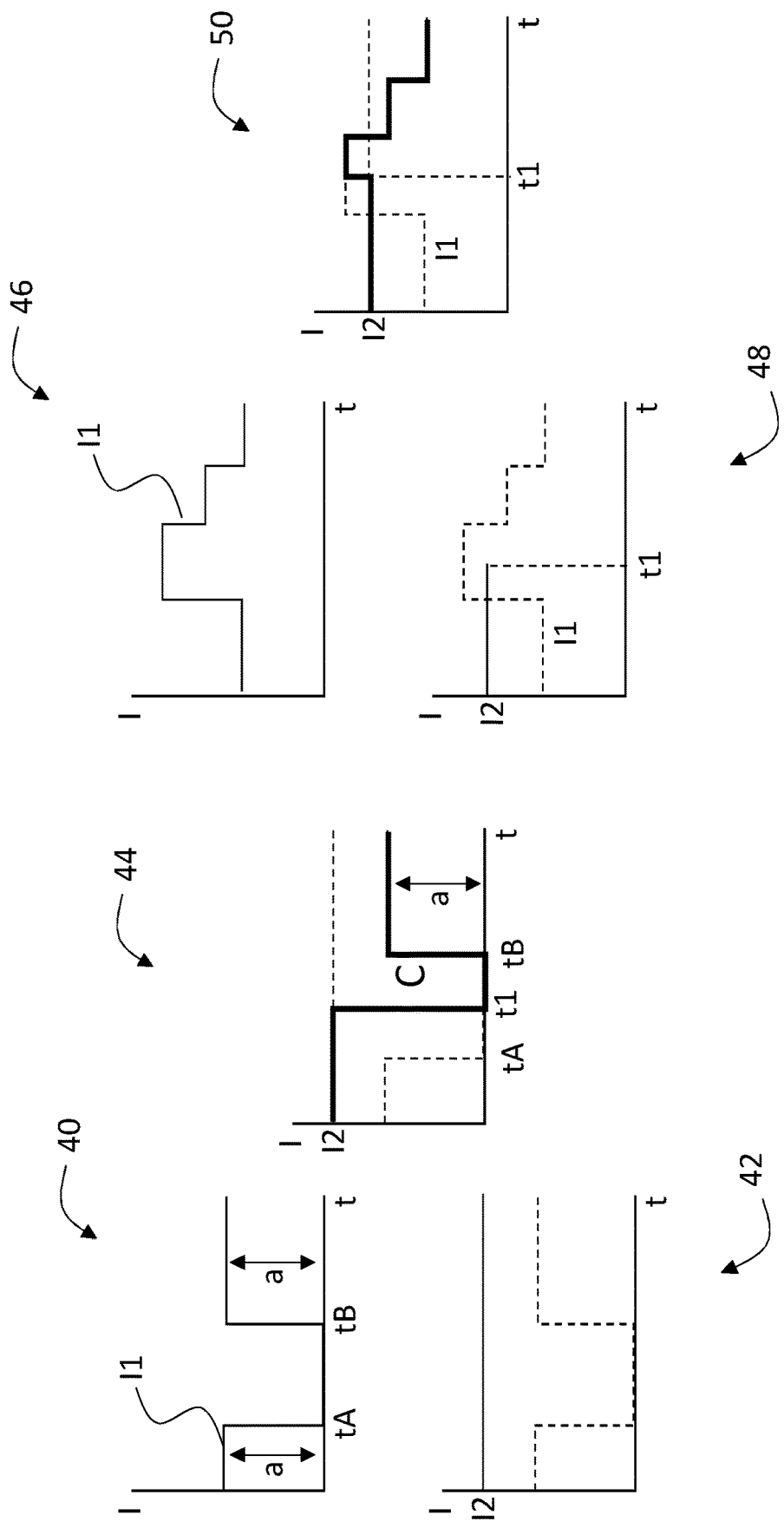

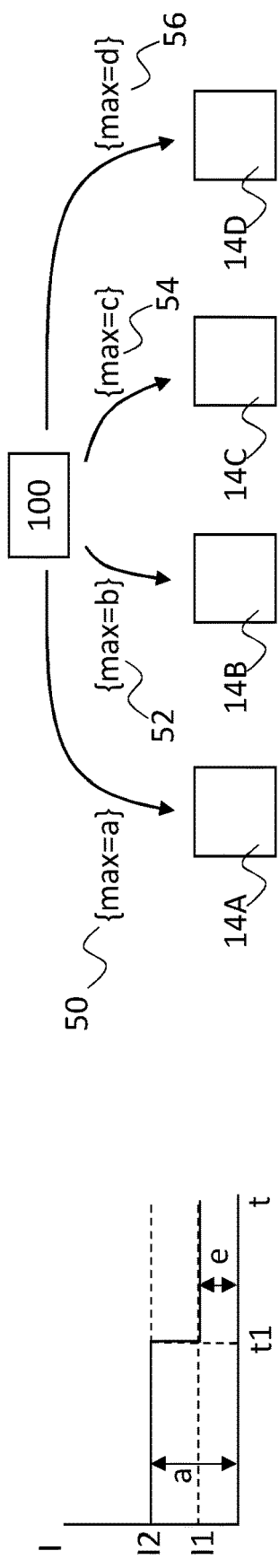
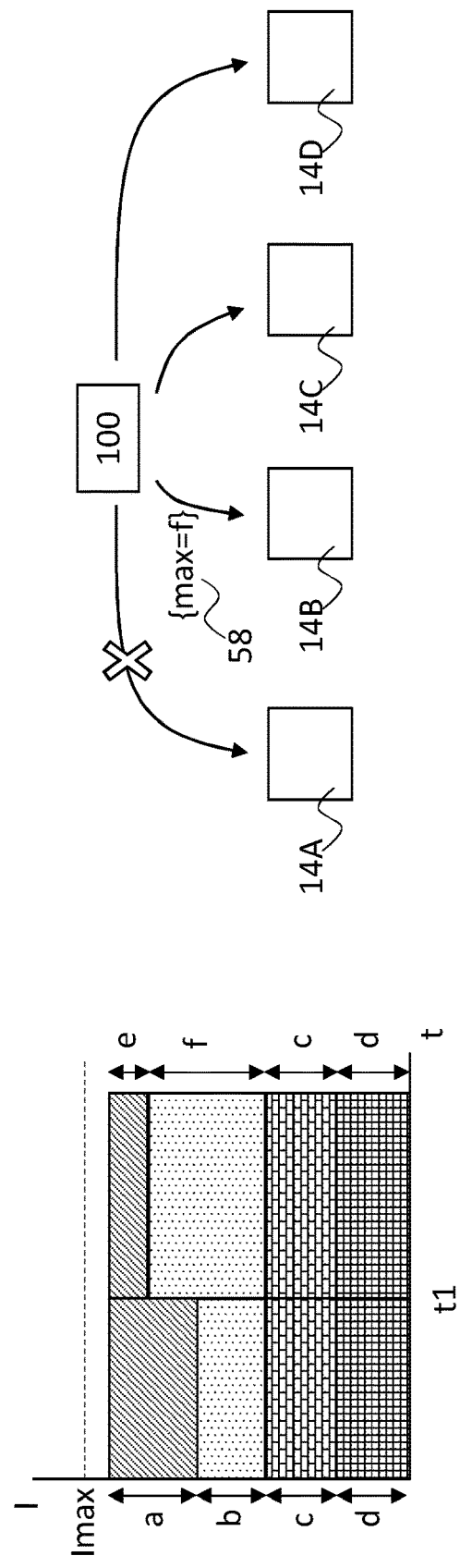
Fig. 5A
Fig. 5B
Fig. 5C
Fig. 5D

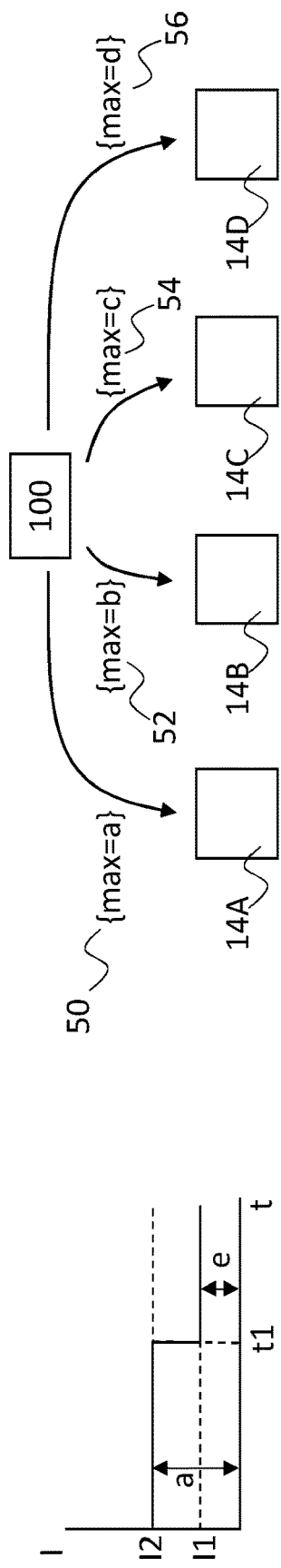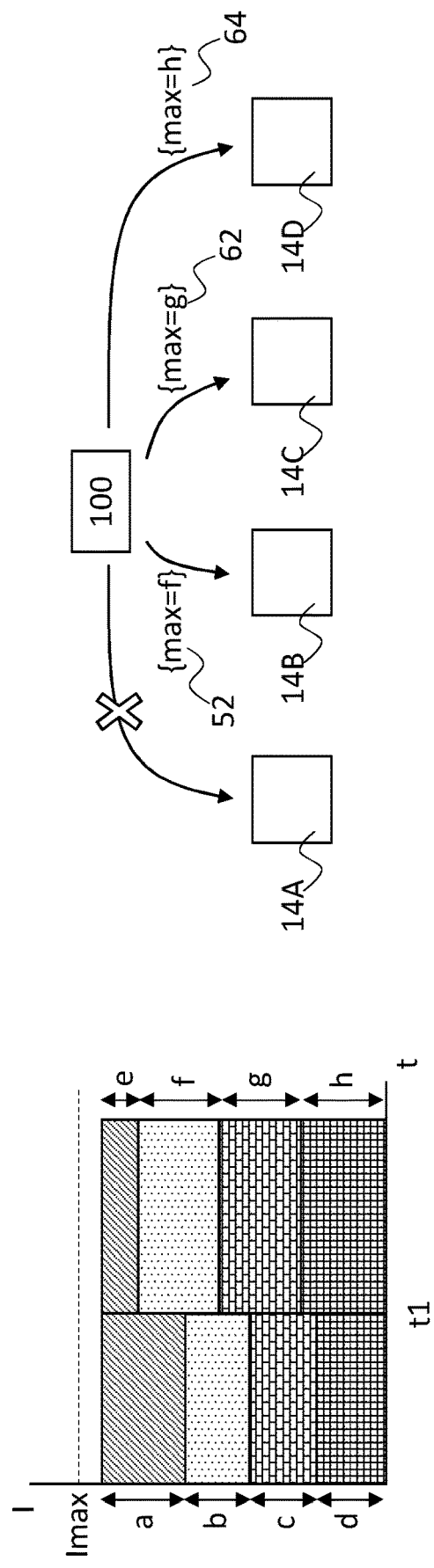
Fig. 6B
Fig. 6C
Fig. 6A
Fig. 6D

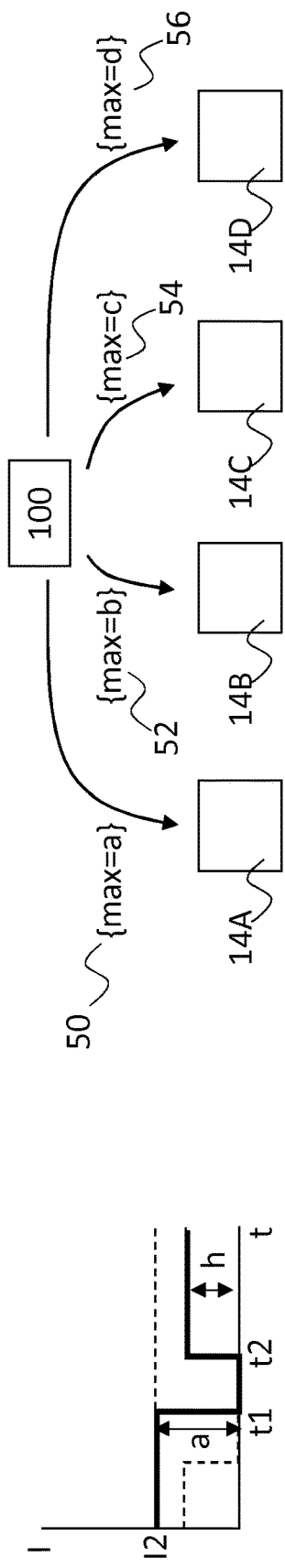
Fig. 7A
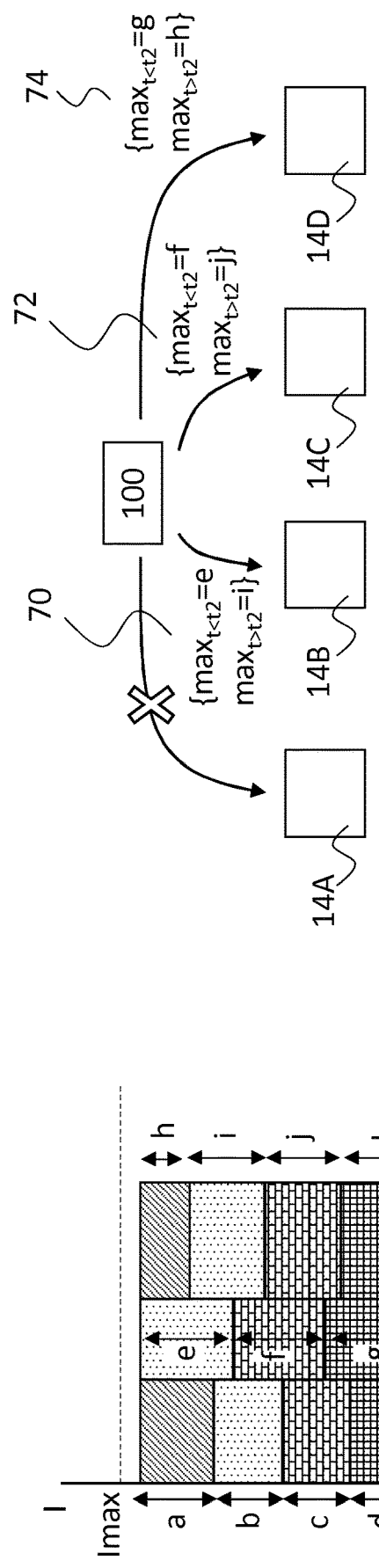
Fig. 7B
Fig. 7C
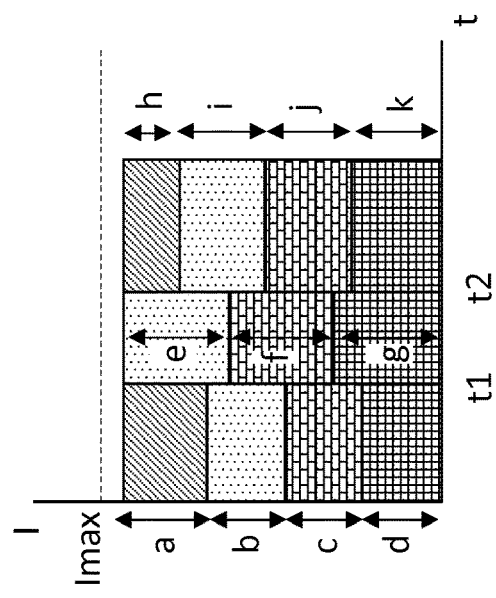
Fig. 7D

METHODS AND SYSTEMS FOR ALLOCATING CHARGING RESOURCES TO ELECTRIC VEHICLES

FIELD OF THE INVENTION

This disclosure relates to methods and systems for allocating charging resources to electric vehicles. In particular, this disclosure relates to such methods and systems wherein default charging profiles are utilized that are effectuated when a communication connection between an electric vehicle supply equipment (EVSE) and a central control system is broken.

BACKGROUND

Electric vehicles are becoming more and more omnipresent. Of course, all these electric vehicles need to be charged regularly. The charging of ever more electric vehicles is expected to put a significant strain on the existing charging infrastructures and power distribution systems. To illustrate, typically, a maximum capacity of charging resources, e.g. amperes, is defined for a group of EVSEs. EVSE stands for Electric Vehicle Supply Equipment. Such a group of EVSEs may also be referred to as a capacity group and is for example formed by EVSEs that are present in a parking lot. The maximum capacity may then define that, at any given time, not more than the maximum capacity can be provided in total to the electric vehicles that are charging in the capacity group.

In order to efficiently, and in a fair manner, allocate the available charging resources, e.g. amperes, across the different EVSEs, a central control system may be utilized that is configured to control how many charging resources each EVSE can consume, i.e. can provide to one or more electric vehicles charging with the EVSE in question. To this end, typically, a communication connection between the central control system and EVSEs is present via which the EVSEs on one side and central control system on the other side can exchange information, such as instructions.

It is an object of the present disclosure to improve the utilization of available charging resources in charging systems comprising a central control system.

SUMMARY

To that end, a method for providing charging resources to one or more electric vehicles is disclosed. The method comprises a control system of an electric vehicle supply equipment, EVSE, storing a default charging profile. The default charging profile defines a first maximum amount of charging resources that the EVSE may provide to one or more electric vehicles charging with the EVSE. The method also comprises the control system of the EVSE receiving from a central control system, via a communication connection between the control system and the central control system, a charging profile. The charging profile defines a second maximum amount of charging resources that the EVSE may provide to one or more electric vehicles charging with the EVSE. The method also comprises the control system effectuating the received charging profile. This comprises causing the EVSE to provide at most the second maximum amount of charging resources to one or more electric vehicles charging with the EVSE. The method also comprises the control system determining that the communication connection between the control system and the central control system is broken and, based on this determination, the control system effectuating the default charging profile comprising causing the EVSE to provide at most the first maximum amount of charging resources to the one or more electric vehicles charging with the EVSE.

If the communication connection between EVSE and central control system, in particular between the control system of the EVSE and the central control system, is broken, then in principle there is no way for the central control system to control the EVSE. For example, it is then no longer possible to transmit instructions to the control system of the EVSE. Such a broken communication connection is problematic, not least because it impedes the efficient allocation of charging resources.

The method disclosed herein utilizes a so-called default charging profile that becomes effective in case the communication connection between the EVSE's control system and central control system is broken. The existence of the default charging profile obviates the need to, for safety reasons, completely shut down the EVSE and stop it from providing charging resources to one or more electric vehicles. The default charging profile may namely be known by the central control system and/or by control systems of other EVSEs which can take into account the default charging profile in the allocation of charging resources.

An amount of charging resources may be understood to refer to an amount of electrical energy and/or amount of electrical power and/or amount of amperes.

In an embodiment, a control system determining that the connection between itself and the central control system is broken may be performed by determining that no message has been received from the central control system for a predetermined time period. In an example, a particular charging profile received by a control system of an EVSE may define an expiry time after which the charging profile is no longer valid. In such case, the control system of the EVSE determining that the connection is broken may be performed by determining that no new charging profile has been received before expiry of the particular charging profile. Then, the control system will revert to the default charging profile if the present charging profile expires. Likewise, the central control system may determine that a connection between itself and a control system of an EVSE is broken by determining that it has not received a message from the control system for some time. For example, the central control system may send a ping message to the control system of the EVSE and if the central control system does not receive a confirmation from the control system that the ping massage has been received, it may determine that the communication connection is broken.

As used herein, a broken communication connection between central control system and a control system of an EVSE may be understood as occurring when there is any event and/or failure and/or status that prevents the central control system to send a charging profile to the control system of the EVSE. For example, it may be that a communication module of the central control system or control system is broken.

In an embodiment, the method comprises receiving the default charging profile, for example from the central control system and/or from another control system of another EVSE. The central control system can for example determine an appropriate default charging profile for each EVSE of a plurality of EVSEs and send it to the EVSE in question.

In an embodiment, the method comprises the control system itself of the EVSE determining the default charging profile. In this embodiment, preferably, the control system then sends the determined default charging profile to the central control system so that the central control system is informed on the default charging profile for the EVSE.

Any default charging profile referred to in this disclosure may be determined by a control system itself of an EVSE or be received from the central control system.

In any case, preferably, the central control system, at some point, has stored the default charging profile for the EVSE. If a plurality of EVSEs are involved, then preferably the central control system stores for each EVSE the associated default charging profile. This allows the central control system to allocate charging resources based on these default charging profiles when one or more of the EVSEs go offline, meaning that a communication connection between EVSE and central control system is broken.

Preferably, the control system of an EVSE is arranged at the EVSE. The central control system may be remote. In an example, the central control system is embodied as a remote server that is connected to the control system via a network such as the internet. A communication connection between central control system and a control system of an EVSE may be at least partially wireless.

The first maximum amount of charging resources may be nonzero. The second maximum amount of charging resources may be nonzero. In fact, any maximum amount of charging resources referred to herein may be nonzero. The first and second maximum amount may be different in the sense that they have different values.

A charging profile as referred to herein, be it a default charging profile or not, can define a maximum amount of charging resources that varies with time. To illustrate, the first charging profile may for example define that the first maximum amount is zero amperes in the time period from 00:00 o'clock to 12:00 o'clock and 20 amperes in the time period from 12:00 o'clock to 23:59 o'clock, for each day. The first and second maximum amount may be different in the sense that they at least for some time period have a different value.

It should be appreciated that, typically, an EVSE is configured to provide charging resources to one and only one electric vehicle.

The central control system may be a distributed system, e.g. in the sense that some of its components are arranged in control systems of respective EVSEs. In an example, the central control system is arranged at a particular EVSE and connected to control systems of other respective EVSEs.

Effectuating any charging profile for an EVSE as referred to herein may comprise causing the EVSE to provide at most a maximum amount of charging resources as defined by the charging profile to one or more electric vehicles charging with the EVSE. Optionally, effectuating any charging profile for an EVSE as referred to herein may comprise causing the EVSE to provide, at any given time, at most a maximum amount of charging resources as defined for that give time, by the charging profile to one or more electric vehicles charging with the EVSE. A control system of EVSE may be configured to control the maximum amount of charging resources, e.g. the maximum amperage, that the EVSE provides to one or more electric vehicles charging with.

The control system of an EVSE may control the amount of charging resources that it provides to an electric vehicle connected to it by communicating to the electric vehicle the maximum amount of charging resources that the electric vehicle may draw from the EVSE, for example in accordance with the methods as described in the IEC61851 standard and/or in the SAE-J1772 standard. Typically, the electric vehicle can control how much charging resources it consumes. The EVSE may subsequently measure the charging resources that it provides to the electric vehicle, for example using an amperemeter. If the (control system of) the EVSE determines that more charging resources are being consumed by the electric vehicle than the communicated maximum amount, the EVSE may be configured to disconnect the electric vehicle from the charging system, e.g. by actuating a power switch.

Such communication between control system of EVSE and electric vehicle may takes place over a specific electrical wire (also referred to as the 'Communication Pilot') that may be part of the charging cable with which the electric vehicle is connected to the EVSE.

It should be appreciated that a charging profile defining a maximum amount of charging resources that may be provided, may be embodied as the charging profile defining a specific amount of charging resources, no more and no less, that should be provided.

In an embodiment, the default charging profile defines a time course of said first maximum amount during a time period, e.g. a day. In this embodiment, the default charging profile defines that the first maximum amount of charging resources is nonzero during a first time slot in said time period and defines that the first maximum amount is substantially zero during a second time slot in said time period. Further, in this embodiment, effectuating the default charging profile comprises causing the EVSE to provide at any given time at most the first maximum amount of charging resources as defined for that given time by the default charging profile.

This embodiment enables to allocate charging resources in a fair manner among a plurality of EVSEs even if several of these EVSEs are no longer connected to the central control system. If all offline EVSEs would be able to provide nonzero charging resources, then it may very well be the case that these offline EVSEs together will try to provide more charging resources than some maximum capacity. This may result in a failure of the system.

A time course of a maximum amount may be understood as defining a dependency of the maximum amount with time. The time course may define a variation of a maximum amount with time. The time course may also define a dependency of a maximum amount with time in the sense that it defines that the maximum amount has a constant value, i.e. has the same value for any point in time.

Any charging profile referred to herein may define a time course of a maximum amount of charging resources. For example, the first and/or second charging profile may define a variation of the first and/or second maximum amount during a time period.

In an embodiment, the method comprises a second control system of a second EVSE storing a second default charging profile. The second default charging profile defines a third maximum amount of charging resources that the second EVSE may provide to one or more electric vehicles charging with the second EVSE. This embodiment also comprises the second control system of the second EVSE receiving from the central control system, via a communication connection between the second control system and the central control system, a second charging profile. The second charging profile defines a fourth maximum amount of charging resources that the second EVSE may provide to one or more electric vehicles charging with the second EVSE. This embodiment also comprises the second control system effectuating the received second charging profile comprising causing the second EVSE to provide at most the fourth maximum amount of charging resources to one or more electric vehicles charging with the second EVSE. This embodiment also comprises determining that the communication connection between the second control system and the central control system is broken, and, based on this determination, effectuating the second default charging profile comprising causing the second EVSE to provide at most the third maximum amount of charging resources to the one or more electric vehicles charging at the second EVSE. In this embodiment, the second default charging profile defines a time course of said third maximum amount during the time period, e.g. a day. The second default charging profile defines that the third maximum amount of charging resources is nonzero during a third time slot in said time period and defining that the third maximum amount is substantially zero during a fourth time slot in said time period. This embodiment also comprises effectuating the second default charging profile comprising causing the second EVSE to provide at any given time at most the third maximum amount of charging resources as defined for that given time by the second default charging profile. Further, in this embodiment, the second and third time slot at least partially overlap.

Thus, in this embodiment, during the overlap of the second and third time slot, the (first) EVSE does not provide charging resources to its one or more electric vehicles and the second EVSE does provide charging resources to its one or more electric vehicles. The (first) EVSE and the second EVSE may belong to the same so-called capacity group. In general, a plurality of EVSEs may for a capacity group associated with capacity group maximum amount of charging resources. The capacity group maximum amount defines a maximum amount of charging resources that can be provided to the capacity group. Optionally the capacity group maximum amount varies with time. By having the first and second EVSE charge at different time slots while they are offline reduces the risk that such capacity group maximum amount is exceeded, which may cause failure of the system.

The first and second EVSEs are different EVSEs. It should be appreciated that the first, second, third, fourth maximum amount may all have the same or different values.

In an example, the second and third time slot completely overlap, i.e. are the same time slot, so that the (first) and second EVSE don't provide charging resources at the same time.

In an embodiment, the method comprises receiving the default charging profile from the central control system via the communication connection between the control system and the central control system and, optionally, receiving the second default charging profile from the central control system via the communication connection between the second control system and the central control system.

In an embodiment, the method comprises each of a plurality of control systems of a plurality of respective EVSEs storing a respective default charging profile. The plurality of EVSEs form a capacity group of EVSEs associated with a capacity group maximum amount of charging resources. The capacity group maximum amount defines a maximum amount of charging resources that can be provided to the capacity group. Further, each default charging profile defines for its associated EVSE a respective maximum amount of charging resources that the EVSE in question may provide to one or more electric vehicles charging with the EVSE in question. In this embodiment, the method further comprises each of one or more of the plurality of control systems, e.g. all of the plurality of control systems, determining that a communication connection between itself and the central control system is broken, and, based on this determination, the control system in question effectuating its stored default charging profile comprising causing its EVSE to provide at most the maximum amount of charging resources, as defined by the default charging profile stored by the control system in question, to the one or more electric vehicles charging with the EVSE in question. Herein, a sum of the respective maximum amounts of charging resources defined by the respective default charging profiles is equal to or less than said capacity group maximum amount of charging resources.

This embodiment is advantageous in that it enables to ensure that, if all control systems are disconnected from the central control system, the capacity group maximum amount is not exceeded. If the EVSEs together try to provide to their electric vehicles more than the capacity group maximum amount, then this may cause system failure. System failure may comprise a circuit breaker tripping, for example a circuit breaker that is present in a building.

In an example, each maximum amount defined by each default charging profile has the same value. This value may be equal to the capacity group maximum amount divided by the number of EVSEs in the capacity group. To illustrate, if the capacity group maximum amount is 100 amperes and five EVSEs form the capacity group, then each maximum amount defined by the five default charging profiles of the respective five EVSEs may be 20 amperes. In this way, if all five EVSEs become disconnected from the central control system, then at most these EVSEs will provide 20 amperes to their electric vehicles and will thus not exceed the capacity group maximum amount of 100 amperes.

In an embodiment, the method comprises each of a plurality of control systems of a plurality of respective EVSEs storing a respective default charging profile. The plurality of EVSEs form a capacity group of EVSEs associated with a capacity group maximum amount of charging resources. The capacity group maximum amount defines a maximum amount of charging resources that can be provided to the capacity group, Each default charging profile defines for its associated EVSE an associated respective maximum amount of charging resources that the EVSE in question may provide to one or more electric vehicles charging with the EVSE in question. Further, each default charging profile defines a time course of its associated maximum amount of charging resources during a time period. In this embodiment, the method further comprises each of one or more of the plurality of control systems, e.g. all of the plurality of control systems, determining that a communication connection between itself and the central control system is broken, and, based on this determination, the control system in question effectuating its stored default charging profile comprising causing its EVSE to provide at most the maximum amount of charging resources, as defined by the default charging profile stored by the control system in question, to the one or more electric vehicles charging with the EVSE in question. Each of said one or more control systems effectuating its stored default charging profile comprises causing the EVSE controlled by the control system in question to provide at any given time at most the maximum amount of charging resources as defined for that given time by the default charging profile stored by the control system in question. In this embodiment, the respective maximum amounts are defined such by the respective charging profiles that for any given time during said time period, a sum of the respective amounts defined for that given time by the respective default charging profiles is equal to or less than said capacity group maximum amount.

If the number of EVSEs in a capacity group is relatively high, then it may be undesired that each maximum amount of charging resources defined by the respective default charging resources has the same, constant value. Then, the value may drop below some threshold value. To illustrate, if the capacity group maximum amount is 100 amperes, and 20 EVSEs form the capacity group, then each maximum defined by each respective default charging profile may only be 5 ampere. However, typically, electric vehicles require some minimum amount of charging resources, e.g. approximately 12 amperes. If they receive less than their minimum amount, then they either will not charge or charge less efficiently meaning that charging resources are lost. The appropriate minimum amount may differ per vehicle. The minimum amount is in principle not lower than 6 A, as a result of the IEC 61851 norm.

Because in this embodiment each default charging profiles defines a time course of its associated maximum amount of charging resources, it is possible to arrange that at any given time, the capacity group maximum amount is not exceeded yet that each EVSE can at some point provide charging resources to its one or more electric vehicle. To illustrate, continuing the above example, if there are 20 EVSEs in the capacity group that is associated with a capacity group maximum amount of 100 amperes, then for example for ten EVSEs the default charging profile may define a maximum amount of 10 amperes for a period from 00:00 o'clock to 12:00 o'clock and a maximum amount of substantially zero amperes for the period from 12:00 o'clock to 23:59 o'clock, whereas the default charging profiles for the other ten EVSEs may define a maximum amount of substantially zero amperes for the period from 00:00 o'clock to 12:00 o'clock and a maximum amount of 10 amperes for the period from 12:00 o'clock to 23:59 o'clock. This would ensure that the maximum amount of charging resources that can be provided at any one time is at least 10 amperes, and not for example only 5 amperes. The latter would be an inefficient use of available charging resources.

In particular, this embodiment enables to arrange that at any given time, the maximum amount defined by a default charging profile is either substantially zero or higher than some minimum amount of charging resources.

In an embodiment, at least some, but preferably all, of the default charging profiles define a maximum amount of charging resources of substantially zero for a time slot in the time period and a nonzero maximum amount of charging resources for another time slot in the time period. Of course, the time slots in which the maximum amount is zero may differ per default charging profile and the time slots in which the maximum amount of charging resources is nonzero may differ per default charging profile.

It should be appreciated that both the (first) EVSE and, optionally, the second EVSE mentioned may be in the plurality of EVSEs that form the capacity group.

Optionally, the capacity group maximum amount varies with time. This may for example be the case if part of the allocatable charging resources originate from a variable source such as from solar panels and/or if part of the allocatable charging resources are provided to a variable load such as to power consumers of a building.

Optionally, each control system of the plurality of control systems may receive a charging profile via the communication connection between the control system in question and the central control system, the charging profile defining a maximum amount of charging resources that the EVSE may provide to one or more electric vehicles charging at the EVSE in question. Optionally, each control system of the plurality of control systems effectuates the charging profile received from the central control system. The reception and effectuation of the charging profile would then typically happen before a determination that a communication connection is broken.

In an embodiment, for any given time during said time period, the sum of the respective amounts defined for that given time by the respective default charging profiles is approximately equal to said capacity group maximum amount.

This embodiment ensures that substantially the entire group capacity amount is allocated in the situation that all EVSEs of the capacity group go offline.

One aspect of this disclosure relates to a method for allocating charging resources to a plurality of electric vehicles. The method comprises a central control system storing a default charging profile for a first electric vehicle supply equipment, EVSE, the default charging profile defining a first maximum amount of charging resources that the first EVSE may provide to one or more electric vehicles charging with the first EVSE. The method also comprises the central control system sending to a first control system of the first EVSE, via a communication connection between the central control system and the first control system, a first charging profile, the first charging profile defining a second maximum amount of charging resources that the first EVSE may provide to an electric vehicle charging with the first EVSE. The method further comprises determining that said communication connection between the first control system and the central control system is broken and, based on this determination, and based on the default charging profile stored for the first EVSE, the central control system sending a second charging profile to a second control system of a second EVSE. The second charging profile defines a third maximum amount of charging resources that the second EVSE may provide to one or more electric vehicles charging with the second EVSE.

The first maximum amount may very well be higher or lower than the second maximum amount. As a result, if the communication connection between the first EVSE and the central control system is broken, then the first EVSE may suddenly provide less, or more, charging resources to its electric vehicle. Since the central control system has stored the first default charging profile, it can take this into account when allocating charging resources to other EVSEs. If the first EVSE can suddenly provide less charging resources because the first maximum amount is lower than the second maximum amount, this may mean that additional charging resources can be allocated to other EVSEs. Hence, this embodiment enables to efficiently use available charging resources.

Optionally, the charging profile is configured to cause the EVSE to provide at most the second maximum amount of charging resources to one or more electric vehicles charging with the EVSE.

Optionally, the default charging profile is configured to cause the EVSE to, based on the control system determining that the communication connection between the control system and the central control system is broken, cause the EVSE to provide at most the first maximum amount of charging resources to one or more electric vehicles charging with the EVSE.

The central control system may send the default charging profile to the control system of the first EVSE, via said communication connection.

In an embodiment, the first charging profile may define an expiry time after which the first charging profile is no longer valid. In such case, the central control system may send the second charging profile based on both the determination that the expiry time has been reached and based on the determination that the communication connection is broken. It could very well be that for example fifteen minutes before the expiry of the first charging profile, the central control system attempts to send a new charging profile to the control system of the first EVSE. Upon determining that this attempt is unsuccessful—for example because it has not received a confirmation message—the central control system may determine that the communication connection is broken. However, the second charging profile need not be immediately sent to the control system of the second EVSE. The central control system may wait until the expiry time of the first charging profile has been reached or wait shortly before this expire, e.g. five minutes before. This mechanism allows to account for the fact that an EVSE may only notice that the communication connection is broken at the moment that a current charging profile expires without having received a new charging profile. In such situation, the central control system may have already determined a broken communication connection, whereas the control system of the EVSE may not have determined that the communication connection is broken meaning that it will not have reverted yet to its default charging profile.

In an embodiment, the method comprises: before determining that said communication connection between the first control system and the central control system is broken, the central control system sending to the second control system a third charging profile. The third charging profile defines a fourth maximum amount of charging resources that the second EVSE may provide to one or more electric vehicles charging with the second EVSE, wherein the second charging profile is different from the third charging profile.

In an embodiment, a plurality of EVSEs, comprising the first and second EVSE, form a capacity group of EVSEs associated with a capacity group maximum amount of charging resources. The capacity group maximum amount defines a maximum amount of charging resources that can be provided to the capacity group, optionally at any given time. The method further comprises: before sending the first charging profile to the first control system, determining the first charging profile based on the third charging profile and on the capacity group maximum amount, and/or before sending the second charging profile to the second control system, determining the second charging profile based on the default charging profile for the first EVSE and on the capacity group maximum amount, and/or before sending the third charging profile to the second control system, determining the third charging profile based on the first charging profile for the first EVSE and on the capacity group maximum amount.

This embodiment enables to determine appropriate charging profiles in a convenient manner.

In an embodiment, the method comprises the central control system storing, for each of a plurality of EVSEs, a respective default charging profile, the plurality of EVSEs forming a capacity group of EVSEs associated with a capacity group maximum amount of charging resources. The capacity group maximum amount defines a maximum amount of charging resources that can be provided to the capacity group, optionally at any given time. Each default charging profile defines for its associated EVSE an associated respective maximum amount of charging resources that the EVSE in question may provide to one or more electric vehicles charging with the EVSE in question. Further, each EVSE comprises a control system. This embodiment further comprises the central control system sending to each control system of each EVSE of the plurality of EVSEs, via a respective communication connection between the central control system and the control system in question, a first charging profile so that the first charging profile is effectuated by the control system in question. Each first charging profile defines for its associated EVSE an associated respective maximum amount of charging resources that the EVSE in question may provide to one or more electric vehicles charging with the EVSE in question. This embodiment also comprises the central control system determining for each of one or more EVSEs of the plurality of EVSEs that the communication connection between the EVSE in question and the central control system is broken, and, based on these determinations, sending a second charging profile to each control system of one or more EVSEs the communication connection of which is intact, so that the second charging profile is effectuated by the control system in question. Each second charging profile defines for its associated EVSE an associated respective maximum amount of charging resources that the EVSE in question may provide to one or more electric vehicles charging with the EVSE in question. The second one or more charging profiles are such that a sum of the respective maximum amounts of charging resources defined by (i) the charging profiles that are effective for the EVSEs the communication connection of which is intact and (ii) the respective maximum amounts of charging resources defined by the respective default charging profiles for the one or more EVSEs the communication connection of which is broken, is equal to or less than said capacity group maximum amount of charging resources.

The first charging profile sent to one or more control system of respective systems may differ per EVSE. The second charging profile sent to one or more control systems of respective EVSEs may differ per EVSE.

The effective charging profiles may be the first charging profile or the second charging profile.

The second charging profiles may be determined based on the capacity group maximum amount and on the default charging profiles of the EVSEs of which the communication connection is broken.

Preferably, at least one maximum amount, associated with at least one EVSE, of the respective maximum amounts defined by the second charging profile is higher than the maximum amount associated with said at least one EVSE and defined by the first charging profile for said at least one EVSE.

In an embodiment, the method comprises the central control system storing, for each of a plurality of EVSEs, a respective default charging profile, the plurality of EVSEs forming a capacity group of EVSEs associated with a capacity group maximum amount of charging resources. The capacity group maximum amount defines a maximum amount of charging resources that can be provided to the capacity group, optionally at any given time. Each default charging profile defines for its associated EVSE an associated respective maximum amount of charging resources that the EVSE in question may provide to one or more electric vehicles charging with the EVSE in question. Each default charging profile defines a time course of its associated maximum amount of charging resources during a time period. Further, each EVSE comprises a control system. This embodiment further comprises the central control system sending to each control system of each EVSE of the plurality of EVSEs, via a respective communication connection between the central control system and the control system in question, a first charging profile so that the first charging profile is effectuated by the control system in question. Each first charging profile defines for its associated EVSE an associated respective maximum amount of charging resources that the EVSE in question may provide to one or more electric vehicles charging with the EVSE in question. Each first charging profile defines a time course of its associated maximum amount of charging resources during the time period. This embodiment also comprises the central control system determining for each of one or more EVSEs of the plurality of EVSEs that the communication connection between the EVSE in question and the central control system is broken, and, based on these determinations, sending a second charging profile to each control system of one or more EVSEs the communication connection of which is intact, so that the second charging profile is effectuated by the control system in question. Each second charging profile defines for its associated EVSE an associated respective maximum amount of charging resources that the EVSE in question may provide to one or more electric vehicles charging at the EVSE in question. Further, each second charging profile defining a time course of its associated maximum amount of charging resources during the time period. In this embodiment, the second one or more charging profiles are such that, for any given time during the time period, a sum of the respective maximum amounts of charging resources defined for that given time by the charging profiles that are effective for the EVSEs the communication connection of which is intact and the respective maximum amounts of charging resources defined for that given time by the respective default charging profiles for the one or more EVSEs the communication connection of which is broken, is equal to or less than said capacity group maximum amount of charging resources.

One aspect of this disclosure relates to a method for allocating charging resources to a plurality of electric vehicles, wherein a plurality of EVSEs form a capacity group of EVSEs associated with a capacity group maximum amount of charging resources. The capacity group maximum amount defines a maximum amount of charging resources that can be provided to the capacity group, optionally at any given time. In this aspect, the method comprises determining, for each of a plurality of EVSEs, a respective default charging profile, wherein each default charging profile defines for its associated EVSE an associated respective maximum amount of charging resources that the EVSE in question may provide to one or more electric vehicles charging with the EVSE in question. Each EVSE comprises a control system. The method further comprises sending to each control system of each EVSE of the plurality of EVSEs, via a respective communication connection between a central control system and the control system in question, the default charging profile of the EVSE in question. Each default charging profile is configured to be effectuated by the control system in question based on a determination that the communication connection between the central control system and the control system in question is broken. The respective maximum amounts are defined such by the respective default charging profiles that a sum of the respective amounts defined by the respective default charging profiles is equal to or less than said capacity group maximum amount.

Each default charging profile may define a time course during a time period for its maximum amount of charging resources. In such case, preferably, the default charging profiles are such that for any given time during said time period, the sum of the respective maximum amounts defined for that given time by the respective default charging profiles is equal to or less than said capacity group maximum amount.

One aspect of this disclose relates to a central control system for a plurality of EVSEs that is configured to perform any of the methods described herein. Such central control system for a plurality of EVSEs may comprise a computer readable storage medium having computer readable program code embodied therewith, and a processor, preferably a microprocessor, coupled to the computer readable storage medium, wherein responsive to executing the computer readable program code, the processor is configured to perform any of the methods described herein.

One aspect of this disclose relates to a control system for an electric vehicle supply equipment, EVSE, that is configured to perform any of the methods described herein. Such control system for a plurality of EVSEs may comprise a computer readable storage medium having computer readable program code embodied therewith, and a processor, preferably a microprocessor, coupled to the computer readable storage medium, wherein responsive to executing the computer readable program code, the processor is configured to perform any of the methods described herein.

One aspect of this disclose relates to a system comprising a plurality of such control systems.

One aspect of this disclose relates to a system for allocating charging resources to a plurality of electric vehicles. The system comprises a central control system as described herein, and a plurality of EVSEs, wherein each EVSE comprises a control system as described herein.

One aspect of this disclose relates to a computer program comprising instructions which, when the program is executed by a control system of an EVSE, cause the control system to perform any of the methods described herein and/or comprising instructions which, when the program is executed by a central control system for a plurality of EVSEs, cause the central control system to perform any of the methods described herein.

One aspect of this disclose relates to a non-transitory computer-readable storage medium having stored thereon any computer program as described herein.

One aspect of this disclosure relates to a method that comprises a central control system performing any of the methods performed by a central control system as described herein and comprises one or more control systems performing any of the methods performed by a control system as described herein.

One aspect of this disclose relates to a computer comprising a computer readable storage medium having computer readable program code embodied therewith, and a processor, preferably a microprocessor, coupled to the computer readable storage medium, wherein responsive to executing the computer readable program code, the processor is configured to perform any of the methods described herein. Each of the central control systems and control systems disclosed herein may comprise and/or be such computer.

One aspect of this disclose relates to a computer program or suite of computer programs comprising at least one software code portion or a computer program product storing at least one software code portion, the software code portion, when run on a computer system, being configured for executing any of the methods described herein.

One aspect of this disclose relates to a non-transitory computer-readable storage medium storing at least one software code portion, the software code portion, when executed or processed by a computer, is configured to perform any of the methods described herein.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a central computer, or entirely on the central computer or server. In the latter scenario, the central computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing control systems or central control system or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which:

FIG. 3A illustrates a default charging profile according to an embodiment having a zero maximum amount for a time slot;

FIG. 3B illustrates a default charging profile according to an embodiment, wherein the default charging profile varies with time;

FIG. 5A-5D illustrate a method according to an embodiment, wherein a second charging profile is sent to a further EVSE;

FIG. 6A-6D illustrate a method according to an embodiment, wherein second charging profiles are sent to multiple online EVSEs;

FIG. 7A-7D illustrate a method according to an embodiment, wherein second charging profiles are sent to multiple online EVSEs, wherein the second charging profiles define a timecourse for a maximum amount of charging resources;

DETAILED DESCRIPTION OF THE DRAWINGS

In the figures, identical reference numbers indicate identical or similar elements.

Figure 1:
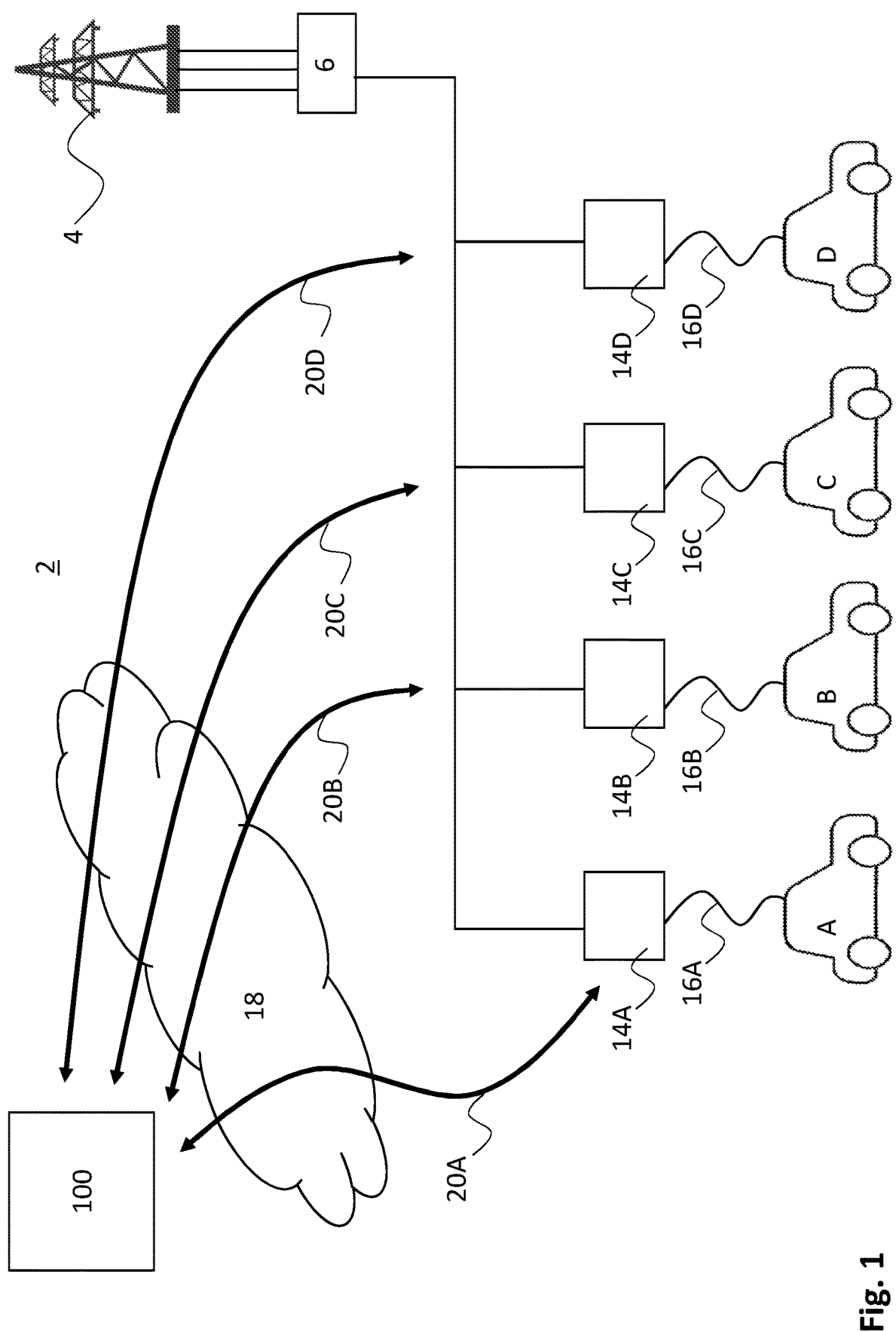
FIG. 1 schematically illustrates a system 2 for allocating charging resources to a plurality of electric vehicles according to an embodiment.

FIG. 1 schematically illustrates a system 2 for allocating charging resources to a plurality of electric vehicles, in this example electric vehicles A, B, C and D. The system comprises a central control system 100 as described herein and a plurality of EVSEs 14, in this example EVSE 14A, EVSE 14B, EVSE 14C, EVSE 14D. Of course, the system 2 may in principle comprise any number of EVSEs in order to charge any number of electric vehicles.

As used herein, electric vehicle may be understood to relate to any vehicle comprising an electric propulsion motor. Non-limiting examples of electric vehicles are electric cars, electric motorcycles, electric bicycles, electric airplanes and electric ships. An electric propulsion motor converts electrical energy into mechanical energy and therefore an electric vehicle comprises one or more batteries for storing electrical energy. The electric vehicles and EVSEs 14 are configured to electrically connect to each other in order to charge the one or more batteries of the electric vehicles. In FIG. 1, the electric vehicles connect to their respective EVSEs by means of a charging cable 16. Such charging cable 16 may be permanently attached to the EVSE. Alternatively, an electric vehicle carries its own charging cable 16 with it so that the charging cable can be used to connect to an EVSE when the electric vehicle arrives at the EVSE.

As shown, the EVSEs may receive power from a power grid 4, preferably via a converter 6. The power converter 6 is typically configured to convert the incoming power into a form that is suitable for the power distribution system that provides power to the EVSEs 14. Power converter 6 may be configured to perform two conversion steps, one step for converting the high voltage one the power grids 4 to medium voltage and another step for converting medium voltage to low voltage.

The central control system 100 is configured to communicate with the control system of each EVSE 16 and each control system of each EVSE is configured to communicate with the central control system 100. To this end, the central control system and control systems of the EVSEs preferably each comprise a communication module that enables such communication, such as a WiFi module.

FIG. 1 indeed shows four communication connections 20A, 20B, 20C, 20D between the central control system 100 and EVSEs 14A, 14B, 14C, 14D respectively. The control system 100 can send charging profiles, such as default charging profiles, to the EVSEs via these communication connections. Further the control system 100 can receive information from the EVSEs via these connections, such as confirmations of receipt and/or a default charging profile as determined by an EVSE and/or meter values as measured local meters arranged at the EVSEs. Likewise, each EVSE can send information to the central control system 100 via the communication connections, such as confirmations of receipt and/or default charging profiles as determined by the EVSE itself and/or meter values as measured by local meter arranged at the EVSE.

The communication connection 20 may be at least partially wireless. In an example, the plurality of EVSEs are installed at a parking lot and they are wireless connected to a central control system that is installed at the parking lot as well. At least part of the central control system may be remote in the sense that it is a remote server, that, in principle, may be positioned anywhere.

In FIG. 1, the EVSEs are connected to the central control system 100 via a network, such as the internet.

Central control system 100, which may also be referred to as data processing system 100, may be understood to be configured to control an amount of charging resources that can be provided by each EVSE to connected electric vehicles. The control system 100 may be configured to control the amount of charging resources that an EVSE provides by sending to the EVSE a so-called charging profile. Such charging profile then defines a maximum amount that the EVSE in question may provide to its electric vehicle. It should be appreciated that the electric vehicle does not necessarily consume this maximum amount. It may very well be that the electric vehicle consumes an amount of charging resources that is lower than said maximum amount. The electric vehicles may not consume an amount of charging resources that is higher than said amount. If the electric vehicle consumes an amount of charging resources that is higher than said amount, then the EVSE may stop the charge session. Note that such a situation will in general not occur.

A plurality of EVSEs may form a capacity group. For such a capacity group a capacity group maximum amount of charging resources is defined. The total amount of charging resources that is provided to the capacity group as a whole should never exceed that capacity group maximum amount. Typically, this would result in a failure of the system. Such a failure may involve a circuit breaker tripping. It should be appreciated that the capacity group maximum amount may also vary with time.

Receiving a particular charging profile or default charging profile may be embodied as receiving an indication of the particular (default) charging profile. A control system may namely have prestored several charging profiles.

Figures 2A, 2B, 2C:
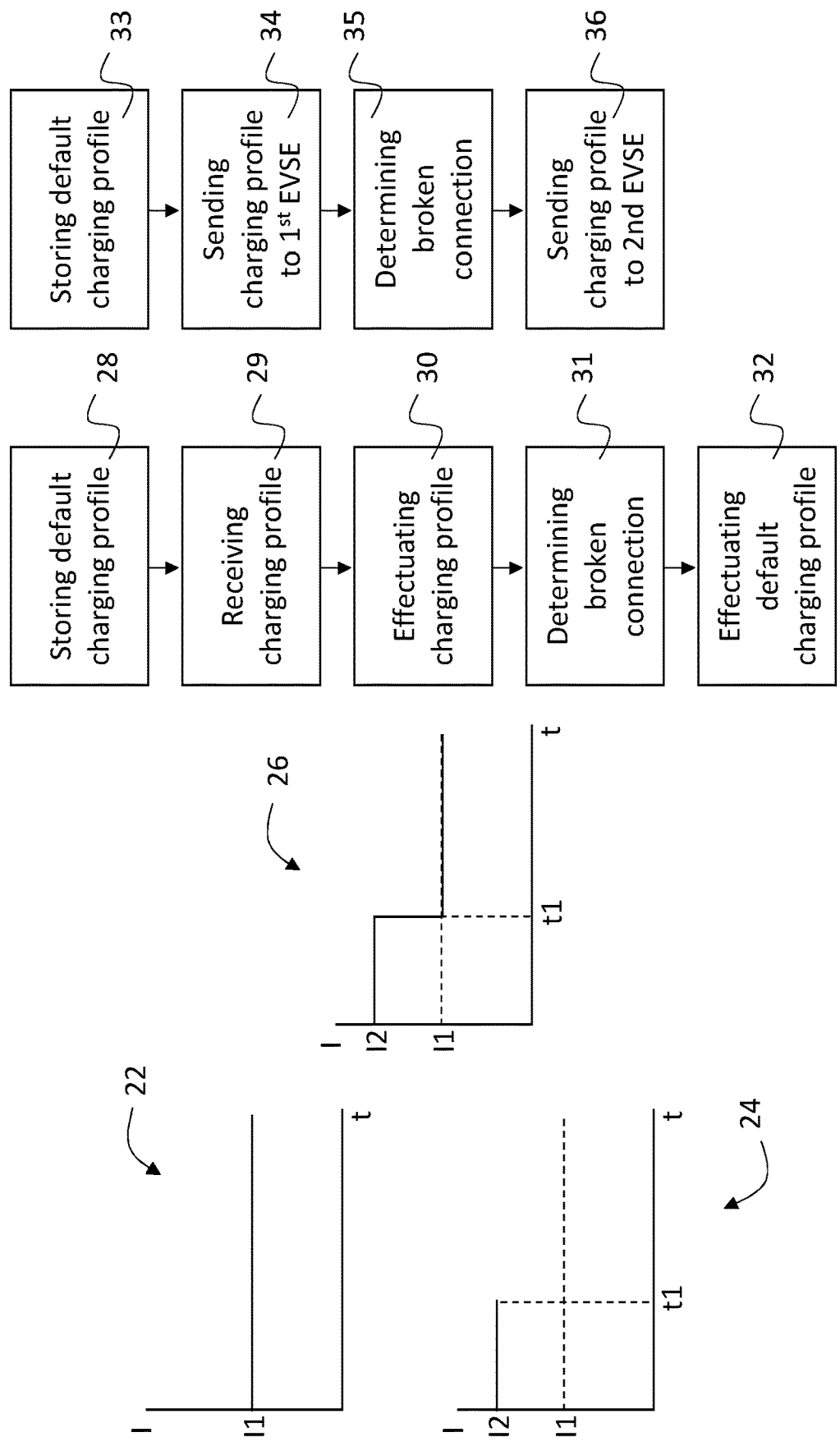
FIG. 2A illustrates how a default charging can be used according to an embodiment.
FIG. 2B illustrates a method for providing charging resources to one or more electric vehicles according to an embodiment.
FIG. 2C illustrates a method for allocating charging resources to a plurality of electric vehicles according to an embodiment.

FIG. 2A illustrates how a default charging can be used according to an embodiment. Charging profile 22 is a default charging profile that is preferably stored by an EVSE. Also, preferably, the central control system 100 has stored this default charging profile in association with the EVSE for which the default charging profile is defined. Default charging profile 22 defines a maximum amount of resources that the EVSE may provide to one or more electric vehicles charging with the EVSE. In this example, the default charging profile defines a maximum amount of I1 amperes.

Charging profile 24 may be referred to as a regular charging profile 24. A control system of an EVSE receives such charging profile from the central control system 100. The charging profile 24 also defines a maximum amount of charging resources that the EVSE may provide to one or more electric vehicles charging with it. In this example, the maximum defined by charging profile 24 is I2. Further, charging profile 24 defines a maximum until time t1 as indicated. In other words, charging profile 24 is valid until time t1. I1 is shown as reference in charging profile 22.

Graph 26 shows an example of what happens when at t1, no new charging profile has been received from the central control system, wherein the new charging profile defines a maximum amount for a time period following t1. The control system of the EVSE determining that at t1 no such new charging profile has been received at t1 may be understood as an embodiment of the control system of the EVSE determining that the communication connection between the control system of the EVSE and the central control system 100 is broken.

The solid line in graph 26 indicates the maximum amount of resources that the EVSE may provide to its one or more electric vehicles. As shown, before t1, charging profile 24 is effective, meaning that before t1, the EVSE may at most provide I2 to electric vehicles. However, at t1, the control system of the EVSE determines that the communication connection between itself and the central control system 100 is broken. Then, based on this determination, the control system of the EVSE effectuates the default charging profile 22, meaning that the EVSE can provide at most I1 to electric vehicles.

In this example, the default charging profile defines a lower maximum amount of charging resources than the "regular" charging profile. However, this is not necessarily the case. Further, the default charging profile 22 defines constant maximum amount of charging resources, but this is not necessarily the case. The same goes for charging profile 24, which in this example defines a constant maximum amount, but this is not necessarily true.

FIG. 2B illustrates a method for providing charging resources to one or more electric vehicles according to an embodiment.

Step 28 comprises a control system of an electric vehicle supply equipment, EVSE, storing a default charging profile, the default charging profile defining a first maximum amount of charging resources that the EVSE may provide to one or more electric vehicles charging with the EVSE.

Step 29 comprises the control system of the EVSE receiving from a central control system, via a communication connection between the control system and the central control system, a charging profile, the charging profile defining a second maximum amount of charging resources that the EVSE may provide to one or more electric vehicles charging with the EVSE.

Step 30 comprises the control system effectuating the received charging profile comprising causing the EVSE to provide at most the second maximum amount of charging resources to one or more electric vehicles charging with the EVSE.

Step 31 comprises the control system determining that the communication connection between the control system and the central control system is broken.

Step 32 comprises based on this determination, the control system effectuating the default charging profile comprising causing the EVSE to provide at most the first maximum amount of charging resources to the one or more electric vehicles charging with the EVSE.

FIG. 2C illustrates a method for allocating charging resources to a plurality of electric vehicles according to an embodiment.

Step 33 comprises a central control system storing a default charging profile for a first electric vehicle supply equipment, EVSE, the default charging profile defining a first maximum amount of charging resources that the first EVSE may provide to one or more electric vehicles charging with the first EVSE.

Step 34 comprises the central control system sending to a first control system of the first EVSE, via a communication connection between the central control system and the first control system, a first charging profile, the first charging profile defining a second maximum amount of charging resources that the first EVSE may provide to one or more electric vehicles charging with the first EVSE, and Step 35 comprises determining that said communication connection between the first control system and the central control system is broken.

Step 36 comprises based on this determination, and based on the default charging profile stored for the first EVSE, the central control system sending a second charging profile to a second control system of a second EVSE, the second charging profile defining a third maximum amount of charging resources that the second EVSE may provide to one or more electric vehicles charging with the second EVSE.

Optionally, before determining that said communication connection between the first control system and the central control system is broken, the central control system may send to the second control system a third charging profile, the third charging profile defining a fourth maximum amount of charging resources that the second EVSE may provide to one or more electric vehicles charging with the second EVSE, wherein the second charging profile is different from the third charging profile.

FIG. 3A illustrates another default charging profile according to an embodiment. Default charging profile 40 defines a time course of for the maximum amount. As shown, the maximum amount varies with time, at least during the time period shown in the figure. Before time tA, the maximum amount has a certain value a. Then, between tA and tB, the maximum amount drops to zero. Further, the default charging profile 40 define a maximum amount of value a again.

The regular charging profile, 42 is the same as charging profile 24 of FIG. 2A except that the maximum amount is also defined for a time period after t1 as indicated. The maximum as defined by the default charging profile 40 is shown for reference.

Graph 44 again shows the maximum amount of charging resources that an EVSE can deliver at any given time. As shown, before t1, i.e. before the EVSE, in particular its control system, determines that the communication connection between itself and the central control system is broken, charging profile 42 is effective. This means that the EVSE will not provide more than an amount I2 of charging resources to electric vehicles charging with it. However, at t1, the control system of the EVSE determines that the communication connection between itself and central control system 100 is broken. In an example, the control system of the EVSE has sent a ping message to the central control system yet has not received a confirmation of receipt from the central control system. Then, based on this determination, the default charging profile 40 becomes effective, instead of charging profile 42. Since default charging profile, at t1 defines a maximum amount of charging resources of zero, the EVSE will not provide any charging resources to one or more electric vehicles charging with it. At tB, the default charging profile defines the maximum amount to have a value a, meaning that from time tB onwards charging resources can be provided again by the EVSE to one or more electric vehicles charging with it. The provided charging resources may still not exceed value a indicated in the figure, though.

FIG. 3B again shows a default charging profile 46 according to an embodiment, and again a charging profile 48, which is similar to charging profile 24. In this example, at t1, the default charging profile defines a higher amount of charging resources than I2. As a result, when the communication connection is determined as broken at t1, the EVSE may actually provide more charging resources to its one or more electric vehicles, more than I2.

In this embodiment, the default charging profile defines a time course for the maximum amount. In such embodiment, effectuating the default charging profile may comprise causing the EVSE to provide at any given time at most the first maximum amount of charging resources as defined for that given time by the default charging profile.

Figure 4A:
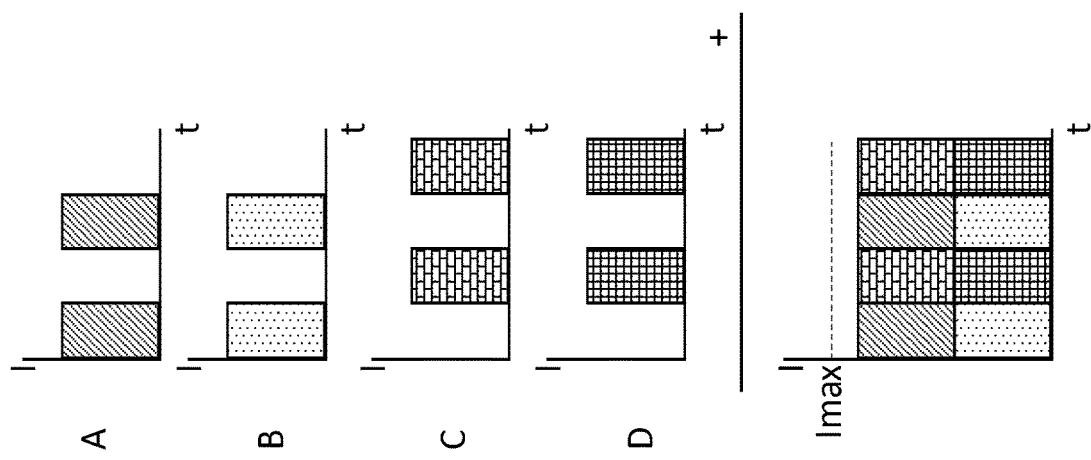
FIGS. 4A-4F each illustrate a set of default charging profiles according to an embodiment.

FIG. 4A illustrates four charging default charging profiles for four respective EVSEs according to an embodiment. In this example, the four EVSEs A, B, C, D form a capacity group of EVSEs associated with a capacity group maximum amount of charging resources, Imax. In the figures of this disclosure, Imax is depicted to have a constant value, i.e. does not change with time. However, the capacity group maximum amount may very well vary with time. In any case, the capacity group maximum amount defines a maximum amount of charging resources that can be provided to the capacity group. Exceeding this maximum amount may for example cause a circuit breaker to trip, which causes a failure of the system. Then, no charging recourses can be provided at all anymore.

In the examples in this disclosure, four EVSEs are present in a capacity group. However, many more EVSEs may be present, and in practice this is typically the case as a person skilled in the art will understand.

In an embodiment, the respective maximum amounts of charging resources as defined by the default charging resources are equal, e.g. may all be given (approximately at least) by the capacity group maximum, Imax, divided by the number of EVSEs that are in the capacity group. However, as depicted in FIG. 4A, the default charging profiles, in particular the maximum amounts that they define, are not necessarily equal. In the embodiment of FIG. 4A, the maximum defined by the default charging profile for EVSE A is much higher than any of the maximum amounts defined by the default charging profiles for EVSEs B, C, D. As shown, on the bottom, the sum of the maximum amounts as defined by the default charging profiles does not exceed the Imax. Hence, if all EVSEs go offline at the same time, meaning that all respective communication connections between EVSEs and the central control system are broken, than the Imax will not be exceeded.

Figure 4B:
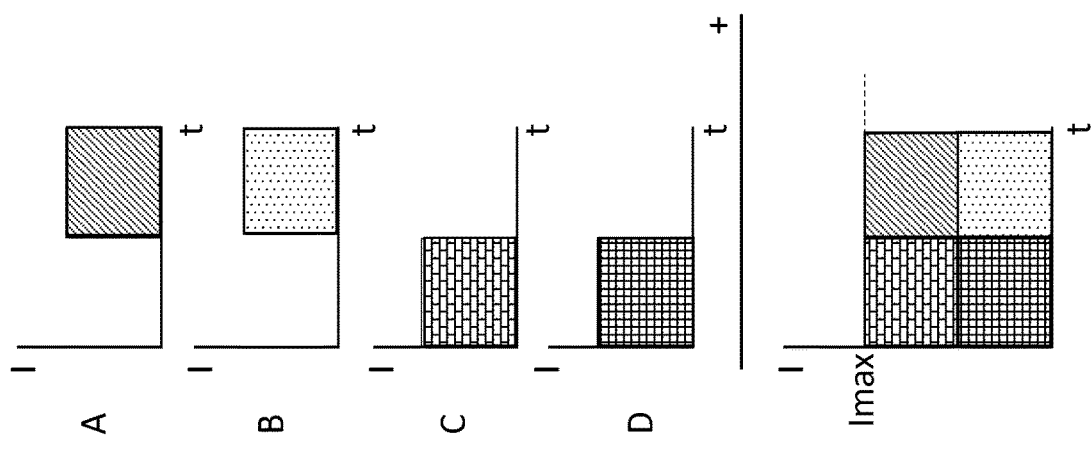

FIG. 4B illustrates default charging profiles for EVSEs A, B, C, D, which, again, are assumed to form a capacity group of EVSEs associated with a capacity group maximum amount Imax indicated in the bottom graph.

In the embodiment of FIG. 4B, the respective default charging profiles define a time course for the maximum amount of charging resources. To illustrate, the default charging profile for EVSE A defines for a first time slot a maximum amount of substantially zero and then a nonzero maximum amount of charging resources for a second time slot. The same holds for the default charging profile for EVSE B. On the other hand, the default charging profile defines for the first time slot a nonzero maximum amount and for the second time slot a substantially zero amount of charging resources. The same holds for the default charging profile for EVSE D. As a result, it can be assured that, if an EVSE The sum of the maximum amounts as defined by the default charging profiles is substantially equal to Imax. Further, the respective maximum amounts are defined such by the default charging profiles for EVSE A, B, C, D that for any given time, the sum of the respective amounts defined for that given time by the respective default charging profiles is equal to or less than said capacity group maximum amount.

The advantage of having default charging profiles that define a maximum amount of substantially zero for a time slot is advantageous in that this allows other default charging profiles to define a higher maximum amount. This is advantageous in that it allows to ensure that no default charging profile defines a maximum amount of charging resources that is higher than zero, yet lower than some minimum amount of charging resources that an electric vehicle should at least receive. To illustrate, is the bare minimum that an electric vehicle should receive is for example 12.5 A, else it does not charge properly. If there would be many EVSEs in a capacity group and none of their default charging profiles would define a zero maximum amount at some time, then at some point, at least some of the default charging profiles would need to define a maximum amount in the forbidden region, i.e. higher than zero and lower than a minimum to be provided amount.

FIG. 4A illustrates an embodiment, wherein the default charging profiles vary with time, yet with a higher frequency than in FIG. 4B.

Figure 4C:
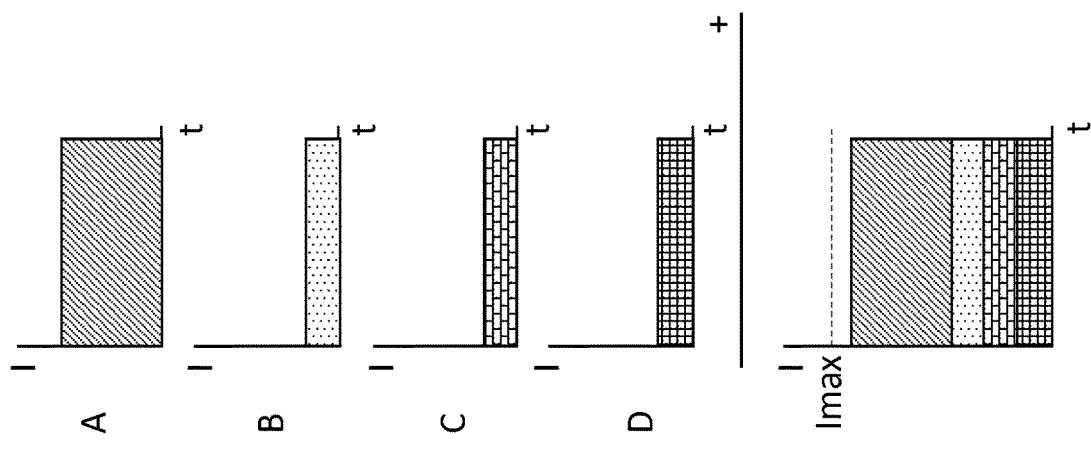

In FIG. 4C, the respective maximum amounts are defined such by the default charging profiles for EVSE A, B, C, D that for any given time, the sum of the respective amounts defined for that given time by the respective default charging profiles is equal to or lower than said capacity group maximum amount Imax as shown in the bottom graph.

Although FIGS. 4A, 4B, 4C only depict default charging profiles for EVSEs A, B, C, D according to three embodiments, it should be appreciated that preferably, these EVSEs preferably receive regular charging profiles from the central control system if the communication connection is intact and provide charging resources to their electric vehicles in accordance with these regular charging profiles. In such embodiment, only if the communication connection is determined to be broken, are the default charging profiles effectuated.

Figure 4D:
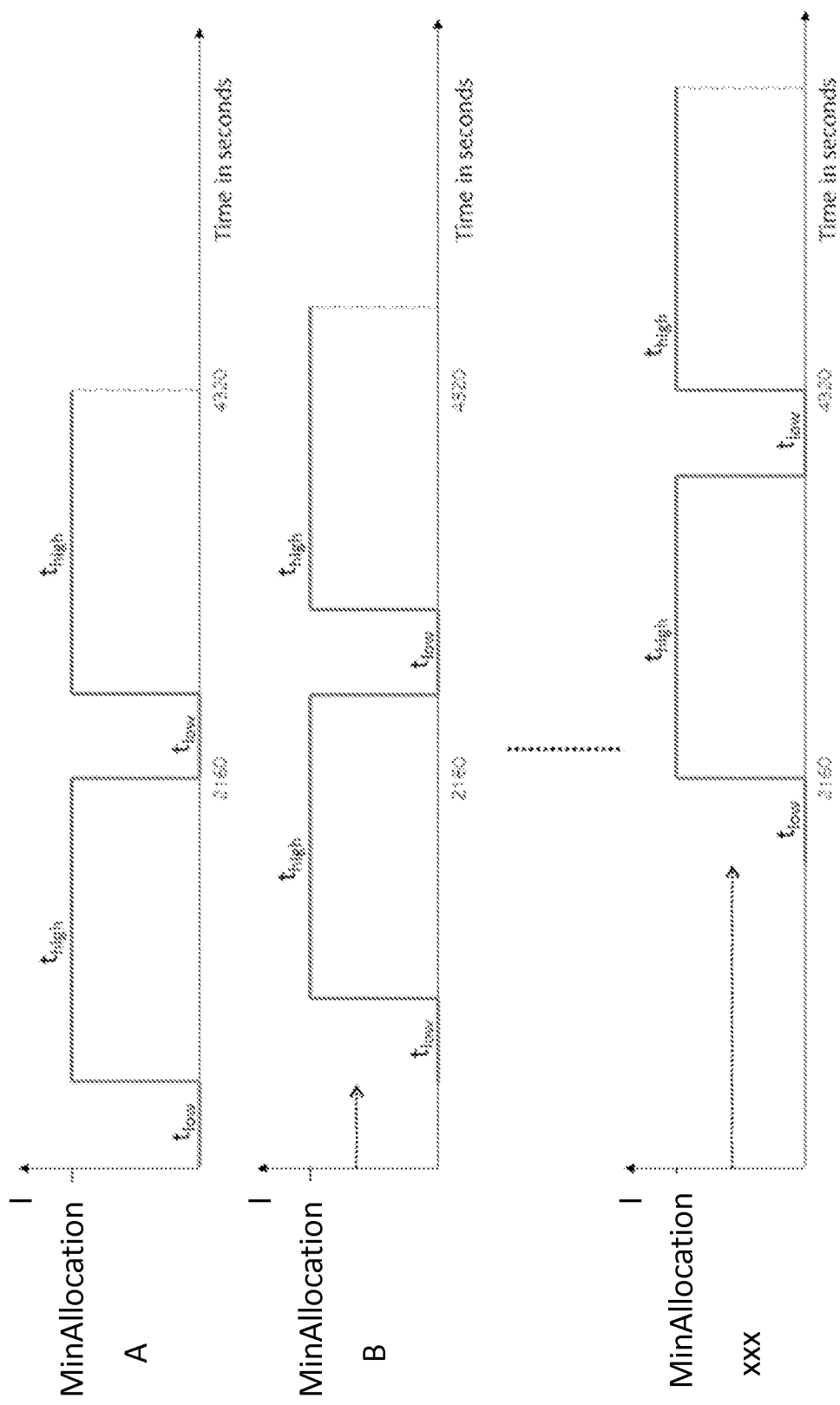

FIG. 4D illustrates default charging profiles for an arbitrary number of EVSEs in the capacity group. It should be appreciated that the default charging profiles may be defined for some time period, for example for a day. Further, it should also be appreciated that the default charging profiles may be recurring in the sense that they are the same for each next time period, e.g. the same for each day.

FIG. 4D, shows MinAllocation, which may be understood to be the minimum amount of charging resources referred to above. This is the amount of charging resources that at least should be provided to each electric vehicle. Further the graph shows, for each EVSE A, B, . . . , xxx, the time slots during which this minimum amount is defined, t_high, and the time slots during which a zero maximum amount is defined, t_low.

The duration of t_low and t_high can be calculated as follows:

MaxSessions=rounddown(SafetyCapacity/MinAllocation), wherein SafetyCapacity is the capacity group maximum amount of charging resources and rounddown( ) is a function that rounds down to the nearest integer. This gives MaxSessions, which may be understood to be the maximum number of EVSEs that may at the same time receive MinAllocation.

Then, the calculation may continue as follows:

$R$=MaxSessions/NumberOfEVSEsInCapacityGroup. wherein

NumberOfEVSEsInCapacityGroup indicates the number of EVSEs that are in the capacity group.

Then, t_high and t_low may be calculated as:

$t\_high = PatternLength \cdot R$ $t\_low = PatternLength \cdot (1-R)$ t_low and t_high may be rounded to be integers. So they will have a value in seconds.

PatternLength is a time period.

In an embodiment, if t_low turns out to be less than some predefined duration, e.g. less than 60 seconds, the chances of overload may be considered negligible and t_low may be set to 0 seconds. Additionally or alternatively, if R is higher than some predetermined amount, e.g. higher than 0.97, t_low may be set to 0 seconds.

If t_low is set to 0 seconds, then a static profile with the value of MinAllocation is used as default charging profile for all EVSEs.

The different EVSEs are allocated in a way that the t_low for the $i^{th}$ EVSE starts when the t_high period for the $(i-1)^{th}$ begins.

Figure 4E:
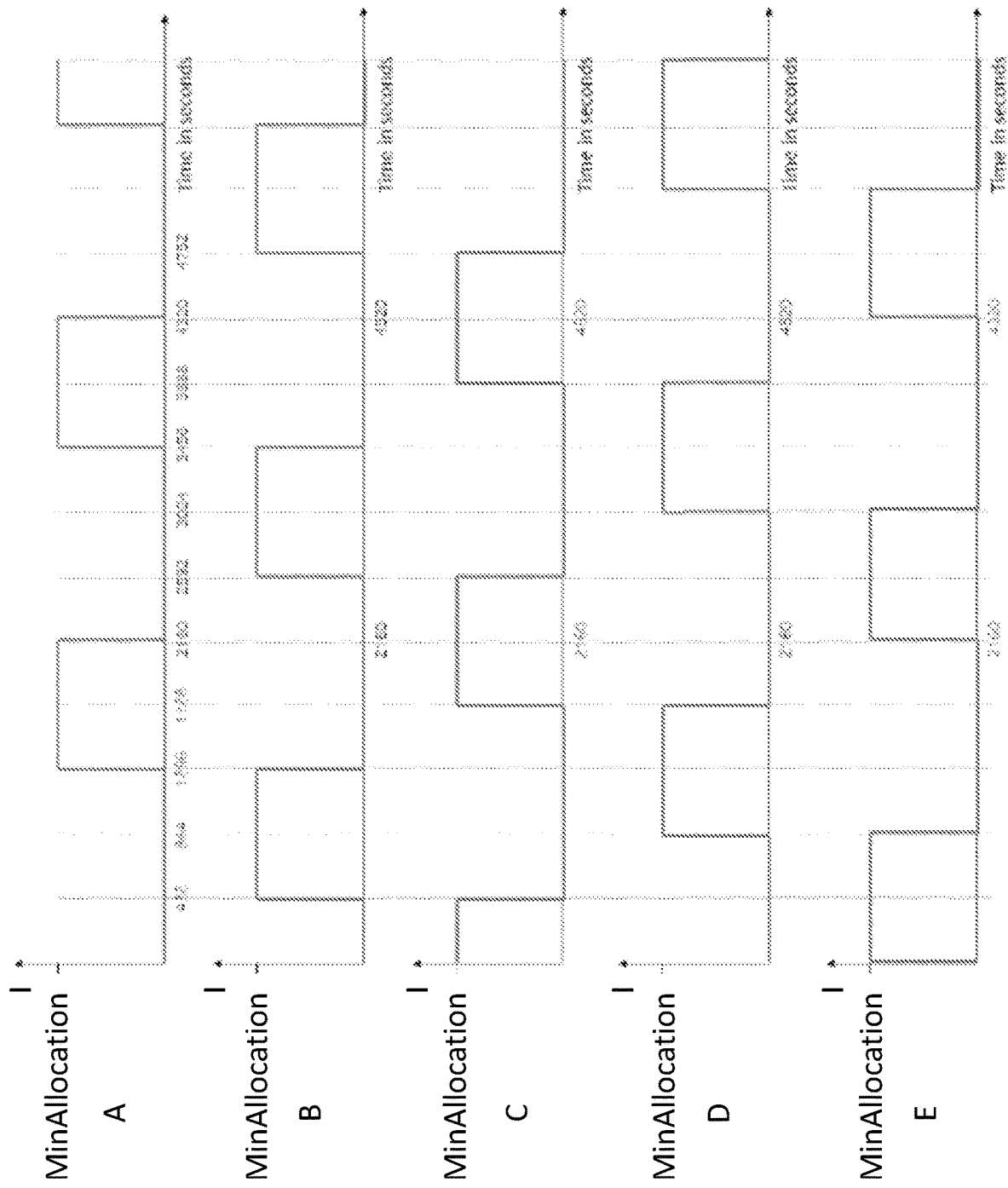

For the default charging profiles of FIG. 4E it is assumed that:
SafetyCapacity=30 A
MinAllocation=12.5 A
MaxSessions=rounddown(30/12.5)=2
NumberOfEVSEsInCapacityGroup=5
R=2/5=0.4
PatternLength=2160 s
t_high=round(PatternLength*R)=round(21600.4)=864 s
t_low=round(PatternLength*(1-R))=round(2160*0.6)
   =1296 s Note that in principle any PatternLength can be used instead of 2160 s. 2160 s is convenient since 86400 s, i.e. the number of seconds in a day, divided by 2160 s gives a round number (40). So a 2160 second schedule fits exactly 40 times in a day. Any other figure (preferably one that fits exactly a number of times in a day) will do. Some EVSEs may be limited in the amount of charging profiles they accept in one daily profile which is why a higher number such as 7200 may be preferred.

The allocation will now be as in FIG. 4E (repeated until t=86400 s (24 hours)). Note that the number of active sessions at any time is never higher than 2, the MaxSessions round( ) is a function that rounds to the nearest integer, which may be higher or lower.

Figure 4F:
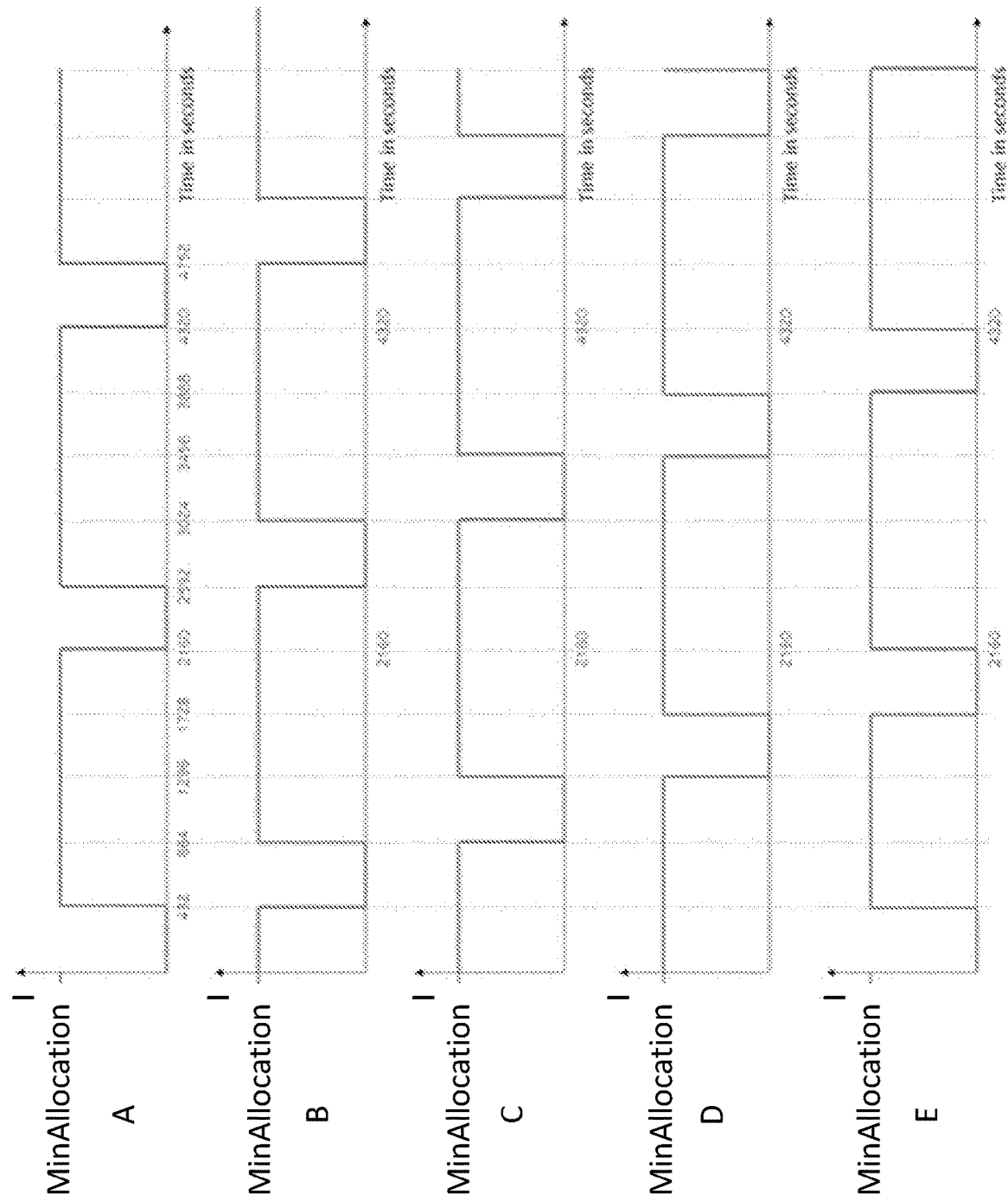

For the default charging profiles shown in FIG. 4F it is assumed that:
SafetyCapacity=55 A
MinAllocation=12.5 A
MaxSessions=rounddown(30/12.5)=4
NumberOfEVSEsInCapacityGroup=5
R=2/5=0.8
PatternLength=2160 s
t_high=round(PatternLength*R)=round(2160.4)=1728 s
t_low=round(PatternLength*(1-R))=round(2160*0.6)
   =432 s The default charging profile will now be as in the figure below (repeated until t=86400 s (24 hours)). Note that the number of active sessions at any time is never higher than 4, the MaxSessions For a further (non-depicted) embodiment) it is assumed that
SafetyCapacity=500 A
MinAllocation=12.5 A
MaxSessions=rounddown(500/12.5)=40
NumberOfEVSEsInCapacityGroup=41
R=40/41=0.9756
PatternLength=2160 s
t_high=round(PatternLength*R)=round(21600.4)=2107 s
t_low=round(PatternLength*(1-R))=round(2160*0.6)
   =53 s The duration of t_low is 53 s, which is smaller than a predetermined value of 60 s, so t_low is set to zero, which means that each of the 41 EVSEs in the capacity group gets a static safe value of 12.5 A, equal to MinAllocation.

FIG. 5A-5D illustrate a method according to an embodiment. FIG. 5A shows an example of what may happen when at some point in time, referred to as t1, EVSE 14A (see FIGS. 5B and 5C) the determines that the communication connection between the control system of the EVSE 14A and the central control system 100 is broken. The solid line in FIG. 5A indicates the maximum amount of resources that the EVSE 14A may provide to its one or more electric vehicles. As shown, before t1, a charging profile is effective, meaning that before t1, the EVSE 14A may at most provide I2, also indicated as "a", to electric vehicles. However, at t1, the control system of EVSE 14A determines that the communication connection between itself and the central control system 100 is broken. Then, based on this determination, the control system of EVSE 14A effectuates a default charging profile, as a result of which the EVSE 14A can provide at most I1, also indicated as "e", to electric vehicles.

In the embodiment of FIG. 5, the central control system 100 has stored, for each EVSE in a capacity group, a respective default charging profile.

FIG. 5B illustrates that the central control system 100 transmits to each EVSE, via respective communication connections indicated by the arrows, a first charging profile so that the first charging profile is effectuated by the control system in question. The first charging profile for EVSE 14A defines a (static) maximum amount of charging resources of "a". The first charging profile for EVSE 14B defines a (static) maximum amount of charging resources of "b". The first charging profile for EVSE 14c defines a (static) maximum amount of charging resources of "c". The first charging profile for EVSE 14d defines a (static) maximum amount of charging resources of "d". The first charging profiles are effectuated. FIG. 5A shows that indeed the first charging profile is effectuated for EVSE 14A because the effective maximum for EVSE 14A, before t1, is "a". Hence, before t1, EVSE 14A will not provide more charging resources to its one or more electric vehicles than "a".

Then, at some point in time t1, the central control system 100 determines for EVSE 14A that the communication connection between the control system of EVSE 14A and the central control system 100 is broken. The central control system 100 may have been waiting for a message, e.g. a confirmation of receipt, from EVSE 14A and, based on a timer expiring before receipt of this message, may the central control system 100 determine that the communication connection is broken.

Based on this determination, the central control system 100 sends (see FIG. 5C) a second charging profile to each control system of one or more EVSEs the communication connection of which is intact. In this example, the one or more EVSEs the communication connection of which is intact is only EVSE 14B as shown in FIG. 5C. Thus, it is not necessarily true that a second charging profile is sent to all online EVSEs. The second charging profile defines a maximum amount of charging resources of "f". The second charging profile is subsequently effectuated by the control system of EVSE 14B.

FIG. 5D shows the sum of the allocated charging resources against time. Before t1, the regular charging profiles are effectuated and the amounts a, b, c, d are less than Imax, i.e. less than the capacity group maximum amount of charging resources. However, after t1, the EVSE 14A has effectuated its default charging profile as a result of which an amount of charging resources "e" (see FIG. 5A) is at most provided by the EVSE 14A to its electric vehicle. Further, it is shown that that EVSE B has been allocated more charging resources, namely amount "f", after t1 than before t1.

The second charging profile for EVSE B is defined such that the sum of the respective maximum amounts of charging resources defined by the charging profiles that are effective for the EVSEs the communication connection of which is intact ("f"+"c"+"d") and the respective maximum amounts of charging resources defined by the respective default charging profiles for the one or more EVSEs the communication connection of which is broken ("e"), is equal to or less than said capacity group maximum amount of charging resources ("f"+"c"+"d"+"e"<=Imax).

This example clearly illustrates that EVSE 14A reverting to its default charging profile causes capacity to free up, which in this example is allocated to EVSE 14B.

FIGS. 6A-6D illustrate a method according to an embodiment. FIG. 6A is the same as FIG. 5A and FIG. 6 is the same as FIG. 5B.

However, in this example (see FIG. 6C) a second charging profile is sent to all online EVSEs, namely to EVSE 14B, 14C, 14D. The second charging profile for EVSE 14B defines a maximum amount "f". The second charging profile for EVSE 14c defines a maximum amount "g". The second charging profile for EVSE 14D defines a maximum amount "h".

FIG. 6D illustrates that in these second charging profiles cause the freed up capacity—resulting from EVSE 14A reverting to its default charging profile—is distributed equally to the other online EVSEs.

FIG. 7A is similar to FIG. 3A. Before t1, a charging profile is effective for EVSE 14A that defines a maximum amount of "a". Then, at t1, the communication connection between the control system of EVSE 14A and central control system 100 is determined broken. The EVSE 14A thus effectuates its default charging profile which defines a zero maximum amount of charging resources for the time slot between t1 and t2 and a maximum of "h" after t2. The reasons for a default charging profile defining a zero maximum have been explained above.

FIG. 7B is the same as FIGS. 5B and 6B and illustrates the central control system 100 sending charging profiles to the EVSEs.

FIG. 7C illustrate that the second charging profiles define a time course for the maximum amount of charging resources. The second charging profile for EVSE 14B defines maximum amount "e" for the time slot before t2 and "I" for the time slot after t2. The second charging profile for EVSE 14C defines maximum amount "f" for the time slot before t2 and "j" for the time slot after t2. The second charging profile for EVSE 14D defines maximum amount "g" for the time slot before t2 and "h" for the time slot after t2.

FIG. 7D illustrates that the group capacity Imax is fully well used and that for any given time, the sum does not exceed Imax.

Before sending a charging profile to a control system of an EVSE, the central control system may determine the charging profile based on one or more other charging profiles sent to other control systems of other ESVEs and/or on one or more default charging profiles of currently offline EVSEs, i.e. of EVSEs the communication connection of which is broken. In particular, the central control system may determine the charging profile such that, when it is sent and effectuated, the sum of the respective maximum amounts of charging resources defined by the charging profiles that are effective for the EVSEs the communication connection of which is intact and the respective maximum amounts of charging resources defined by the respective default charging profiles for the one or more EVSEs the communication connection of which is broken, will be equal to or less than, preferably approximately equal to, the capacity group maximum amount of charging resources.

One aspect of this disclosure relates to method for allocating charging resources to a plurality of electric vehicles, wherein a plurality of EVSEs form a capacity group of EVSEs associated with a capacity group maximum amount of charging resources, the capacity group maximum amount defining a maximum amount of charging resources that can be provided to the capacity group, optionally at any given time, the method comprising determining, for each of a plurality of EVSEs, a respective default charging profile, wherein each default charging profile defines for its associated EVSE an associated respective maximum amount of charging resources that the EVSE in question may provide to one or more electric vehicles charging with the EVSE in question, wherein each EVSE comprises a control system, and sending to each control system of each EVSE of the plurality of EVSEs, via a respective communication connection between a central control system and the control system in question, the default charging profile of the EVSE in question, each default charging profile being configured to be effectuated by the control system in question based on a determination that the communication connection between the central control system and the control system in question is broken, wherein the respective maximum amounts are defined such by the respective default charging profiles that a sum of the respective amounts defined by the respective default charging profiles is equal to or less than said capacity group maximum amount.

Figure 8:
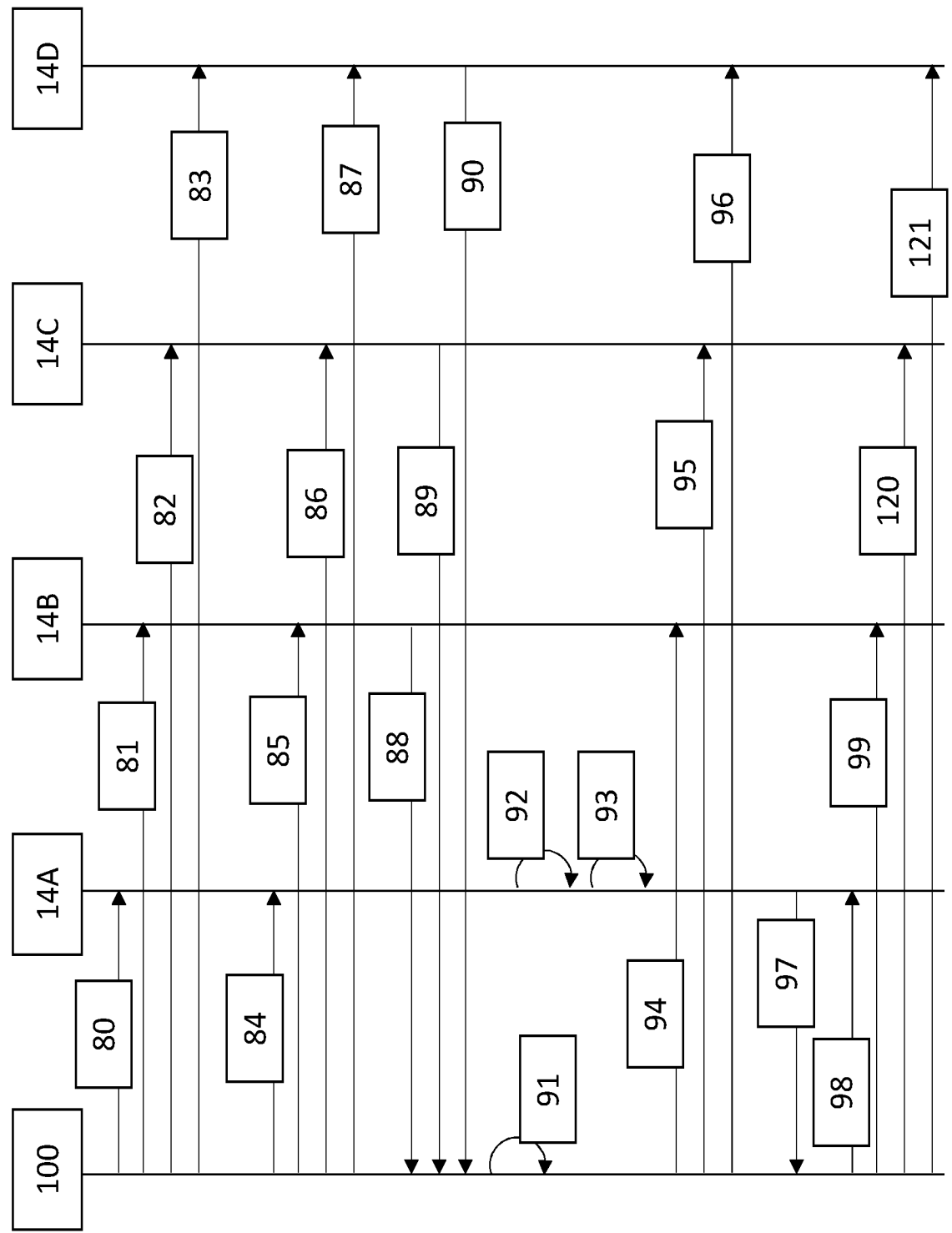
FIG. 8 is a time diagram illustrating communication between central control system and respective control systems of EVSEs according to an embodiment.

FIG. 8 is a time diagram illustrating the communication between central control system 100 and (control systems of) EVSEs 14A, 14B, 14C and 14D according to an embodiment.

Messages 80, 81, 82, 83 illustrate the default charging profiles as determined by the central control system 100 being sent to the respective EVSEs.

Then, messages 84, 85, 86, 87 illustrate the central control system 100 sending first charging profiles to the respective EVSEs.

However, only EVSEs 14B, 14C and 14D respond with a confirmation message confirming that they have received the first charging profiles. These confirmation messages are message 88, 89, 90.

The central control system 100 may determine (step 91) that it has not received a confirmation message and as a result determines that the communication connection with EVSE 14A is broken.

Preferably roughly at the same time, EVSE 14A performs step 92 which is determining that its communication connection is broken. Here also, the control system of EVSE 14A may have expected a message from the central control system 100 yet has not received within some expected time slot. This may cause the control system of EVSE 14A to determine that its communication connection is broken. Then, the control system of EVSE 14 effectuates its default charging profile in step 93.

Based on step 91, the central control system 100 determines second charging profiles for the other EVSEs 14B, 14C, 14D, for example to allocate freed up capacity. Although depicted, it is not necessary that all online control systems of EVSEs receive a second charging profile.

Then, at some point in time, the control system of EVSE 14A determines that it is again connected to the central control system and sends a message 97 to the central control system 100.

As a response, the central control system may again determine charging profiles for the EVSEs and send these charging profiles to the EVSEs in messages 98, 99, 120, 121.

Figure 9:
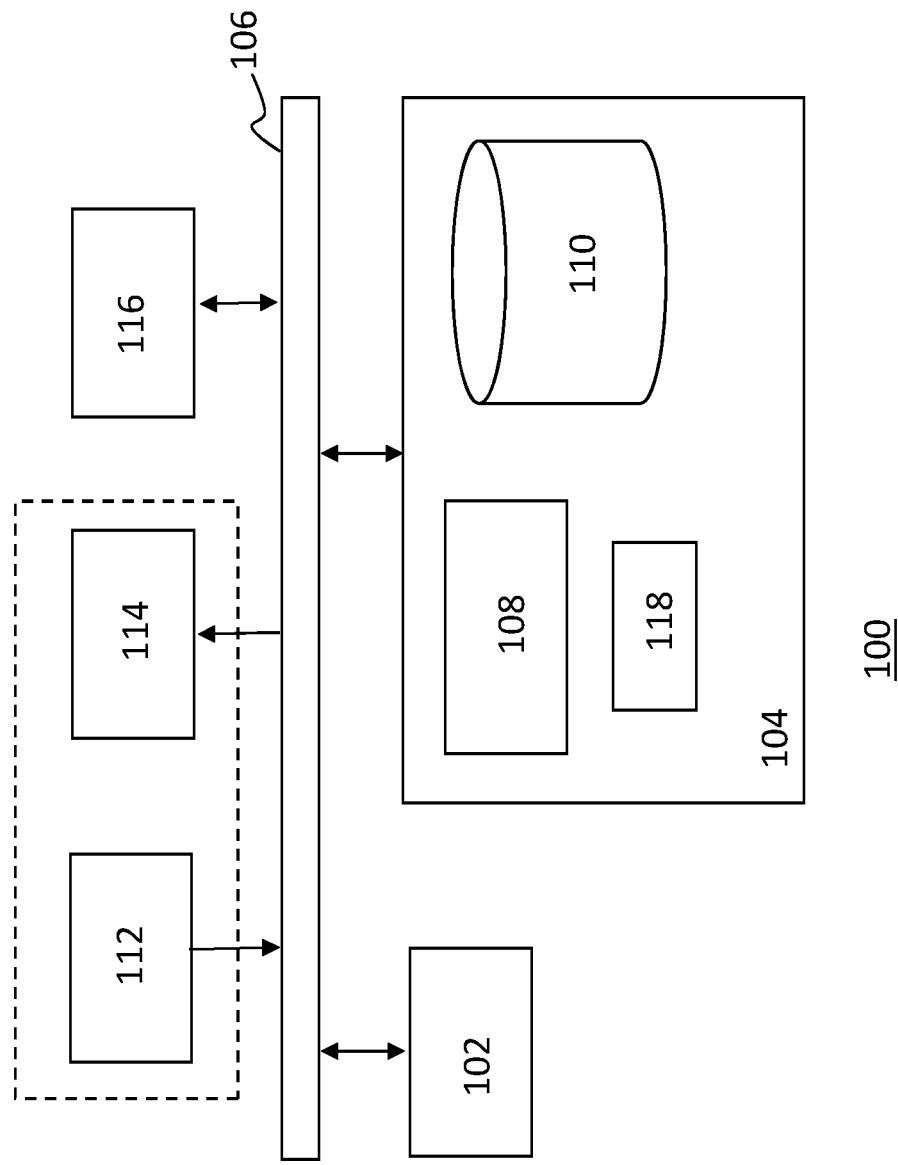
FIG. 9 illustrates a data processing system according to an embodiment.

FIG. 9 depicts a block diagram illustrating a data processing system according to an embodiment.

As shown in FIG. 9, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, a touch-sensitive display, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, central network devices, and/or central storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 9, the memory elements 104 may store an application 118. In various embodiments, the application 118 may be stored in the local memory 108, the one or more bulk storage devices 110, or apart from the local memory and the bulk storage devices. It should be appreciated that the data processing system 100 may further execute an operating system (not shown in FIG. 9) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

In one aspect of the present invention, the data processing system 100 may represent a control system of an EVSE and/or the central control system as described herein.

In another aspect, the data processing system 100 may represent a client data processing system. In that case, the application 118 may represent a client application that, when executed, configures the data processing system 100 to perform the various functions described herein with reference to a "client". Examples of a client can include, but are not limited to, a personal computer, a portable computer, a mobile phone, or the like.

In yet another aspect, the data processing system 100 may represent a server. For example, the data processing system may represent an (HTTP) server, in which case the application 118, when executed, may configure the data processing system to perform (HTTP) server operations.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A method for providing charging resources to one or more electric vehicles, the method comprising a control system of an electric vehicle supply equipment, EVSE, storing a default charging profile, the default charging profile defining a first maximum amount of charging resources that the EVSE may provide to one or more of said electric vehicles charging with the EVSE, the control system of the EVSE receiving from a central control system, via a communication connection between the control system and the central control system, a first charging profile, the first charging profile defining a second maximum amount of charging resources that the EVSE may provide to one or more of said electric vehicles charging with the EVSE, the control system effectuating the received charging profile comprising causing the EVSE to provide at most the second maximum amount of charging resources to one or more of said electric vehicles charging with the EVSE, the control system determining that the communication connection between the control system and the central control system is broken, based on this determination, the control system effectuating the default charging profile comprising causing the EVSE to provide at most the first maximum amount of charging resources to the one or more electric vehicles charging with the EVSE, and the default charging profile defining a time course of said first maximum amount during a time period, the default charging profile defining that the first maximum amount of charging resources is nonzero during a first time slot in said time period and defining that the first maximum amount is equivalent to zero during a second time slot in said time period, wherein effectuating the default charging profile comprises causing the EVSE to provide at any given time at most the first maximum amount of charging resources as defined for that given time by the default charging profile.

2. The method according to claim 1, further comprising a second control system of a second EVSE storing a second default charging profile, the second default charging profile defining a third maximum amount of charging resources that the second EVSE may provide to one or more of said electric vehicles charging with the second EVSE, the second control system of the second EVSE receiving from the central control system, via a communication connection between the second control system and the central control system, a second charging profile, the second charging profile defining a fourth maximum amount of charging resources that the second EVSE may provide to one or more of said electric vehicles charging with the second EVSE, the second control system effectuating the received second charging profile comprising causing the second EVSE to provide at most the fourth maximum amount of charging resources to one or more of said electric vehicles charging with the second EVSE, determining that the communication connection between the second control system and the central control system is broken, and based on this determination, effectuating the second default charging profile comprising causing the second EVSE to provide at most the third maximum amount of charging resources to the one or more electric vehicles charging with the second EVSE, wherein the second default charging profile defines a time course of said third maximum amount during the time period, the second default charging profile defining that the third maximum amount of charging resources is nonzero during a third time slot in said time period and defining that the third maximum amount is equivalent to zero during a fourth time slot in said time period, effectuating the second default charging profile comprises causing the second EVSE to provide at any given time at most the third maximum amount of charging resources as defined for that given time by the second default charging profile, and the second and third time slot at least partially overlap.

3. The method according to claim 1, comprising receiving the default charging profile from the central control system via the communication connection between the control system and the central control system.

4. The method according to claim 1, further comprising
each of a plurality of control systems of a plurality of respective EVSEs storing a respective default charging profile, the plurality of EVSEs forming a capacity group of EVSEs associated with a capacity group maximum amount of charging resources, the capacity group maximum amount defining a maximum amount of charging resources that can be provided to the capacity group, wherein each default charging profile defines for its associated EVSE a respective maximum amount of charging resources that the EVSE in question may provide to one or more of said electric vehicles charging with the EVSE in question, the method further comprising each of one or more of the plurality of control systems determining that a communication connection between itself and the central control system is broken, and, based on this determination, the control system in question effectuating its stored default charging profile comprising causing its EVSE to provide at most the maximum amount of charging resources, as defined by the default charging profile stored by the control system in question, to the one or more electric vehicles charging with the EVSE in question, wherein a sum of the respective maximum amounts of charging resources defined by the respective default charging profiles is equal to or less than said capacity group maximum amount of charging resources.

5. The method according to claim 1, further comprising
each of a plurality of control systems of a plurality of respective EVSEs storing a respective default charging profile, the plurality of EVSEs forming a capacity group of EVSEs associated with a capacity group maximum amount of charging resources, the capacity group maximum amount defining a maximum amount of charging resources that can be provided to the capacity group, wherein each default charging profile defines for its associated EVSE an associated respective maximum amount of charging resources that the EVSE in question may provide to one or more of said electric vehicles charging with the EVSE in question, each default charging profile defines a time course of its associated maximum amount of charging resources during a time period, the method further comprising each of one or more of the plurality of control systems determining that a communication connection between itself and the central control system is broken, and, based on this determination, the control system in question effectuating its stored default charging profile comprising causing its EVSE to provide at most the maximum amount of charging resources, as defined by the default charging profile stored by the control system in question, to the one or more electric vehicles charging with the EVSE in question, wherein each of said one or more control systems effectuating its stored default charging profile comprises causing the EVSE controlled by the control system in question to provide at any given time at most the maximum amount of charging resources as defined for that given time by the default charging profile stored by the control system in question, and the respective maximum amounts are defined by the respective default charging profiles as being that for any given time during said time period, a sum of the respective amounts defined for that given time by the respective default charging profiles is equal to or less than said capacity group maximum amount.

6. The method according to claim 5, wherein for any given time during said time period, the sum of the respective amounts defined for that given time by the respective default charging profiles is equivalent to said capacity group maximum amount.

7. A non-transitory computer-readable storage medium having stored thereon a computer program comprising instructions which, when the program is executed by a control system of an EVSE, cause the control system to perform the method according to claim 1.

8. A method for allocating charging resources to a plurality of electric vehicles, comprising a central control system storing a default charging profile for a first electric vehicle supply equipment, EVSE, the default charging profile defining a first maximum amount of charging resources that the first EVSE may provide to one or more of said electric vehicles charging with the first EVSE, the central control system sending to a first control system of the first EVSE, via a communication connection between the central control system and the first control system, a first charging profile, the first charging profile defining a second maximum amount of charging resources that the first EVSE may provide to one or more of said electric vehicles charging with the first EVSE, determining that said communication connection between the first control system and the central control system is broken, based on this determination and based on the default charging profile stored for the first EVSE, the central control system sending a second charging profile to a second control system of a second EVSE, the second charging profile defining a third maximum amount of charging resources that the second EVSE may provide to one or more of said electric vehicles charging with the second EVSE, the central control system storing, for each of a plurality of EVSEs, a respective default charging profile, the plurality of EVSEs forming a capacity group of EVSEs associated with a capacity group maximum amount of charging resources, the capacity group maximum amount defining a maximum amount of charging resources that can be provided to the capacity group, wherein each default charging profile defines for its associated EVSE an associated respective maximum amount of charging resources that the EVSE in question may provide to one or more of said electric vehicles charging with the EVSE in question, and each default charging profile defines a time course of its associated maximum amount of charging resources during a time period, wherein each EVSE comprises a control system, the central control system sending to each control system of each EVSE of the plurality of EVSEs, via a respective communication connection between the central control system and the control system in question, the first charging profile so that the first charging profile is effectuated by the control system in question, each first charging profile defining for its associated EVSE an associated respective maximum amount of charging resources that the EVSE in question may provide to one or more of said electric vehicles charging with the EVSE in question, each first charging profile defining a time course of its associated maximum amount of charging resources during the time period, and the central control system determining for each of one or more EVSEs out of the plurality of EVSEs that the communication connection between the EVSE in question and the central control system is broken, and, based on these determinations, sending a second charging profile to each control system of one or more EVSEs the communication connection of which is intact, so that the second charging profile is effectuated by the control system in question, each second charging profile defining for its associated EVSE an associated respective maximum amount of charging resources that the EVSE in question may provide to one or more of said electric vehicles charging with the EVSE in question, each second charging profile defining a time course of its associated maximum amount of charging resources during the time period, wherein the second one or more charging profiles are such that, for any given time during the time period, a sum of the respective maximum amounts of charging resources defined for that given time by the charging profiles that are effective for the EVSEs the communication connection of which is intact and the respective maximum amounts of charging resources defined for that given time by the respective default charging profiles for the one or more EVSEs the communication connection of which is broken, is equal to or less than said capacity group maximum amount of charging resources.

9. The method according to claim 8, further comprising before determining that said communication connection between the first control system and the central control system is broken, the central control system sending to the second control system a third charging profile, the third charging profile defining a fourth maximum amount of charging resources that the second EVSE may provide to one or more of said electric vehicles charging with the second EVSE, wherein the second charging profile is different from the third charging profile.

10. The method according to claim 8, wherein a plurality of EVSEs, comprising the first and second EVSE, form a capacity group of EVSEs associated with a capacity group maximum amount of charging resources, the capacity group maximum amount defining a maximum amount of charging resources that can be provided to the capacity group, the method further comprising before sending the first charging profile to the first control system, determining the first charging profile based on the third charging profile and on the capacity group maximum amount, and/or before sending the second charging profile to the second control system, determining the second charging profile based on the default charging profile for the first EVSE and on the capacity group maximum amount, and/or before sending the third charging profile to the second control system, determining the third charging profile based on the first charging profile for the first EVSE and on the capacity group maximum amount.

11. The method according to claim 8, comprising the central control system storing, for each of a plurality of EVSEs, a respective default charging profile, the plurality of EVSEs forming a capacity group of EVSEs associated with a capacity group maximum amount of charging resources, the capacity group maximum amount defining a maximum amount of charging resources that can be provided to the capacity group, wherein each default charging profile defines for its associated EVSE an associated respective maximum amount of charging resources that the EVSE in question may provide to one or more of said electric vehicles charging with the EVSE in question, and each EVSE comprises a control system, the central control system sending to each control system of each EVSE of the plurality of EVSEs, via a respective communication connection between the central control system and the control system in question, the first charging profile so that the first charging profile is effectuated by the control system in question, each first charging profile defining for its associated EVSE an associated respective maximum amount of charging resources that the EVSE in question may provide to one or more of said electric vehicles charging with the EVSE in question, and the central control system determining for each of one or more EVSEs of the plurality of EVSEs that the communication connection between the EVSE in question and the central control system is broken, and, based on these determinations, sending a second charging profile to each control system of one or more EVSEs the communication connection of which is intact, so that the second charging profile is effectuated by the control system in question, each second charging profile defining for its associated EVSE an associated respective maximum amount of charging resources that the EVSE in question may provide to one or more of said electric vehicles charging with the EVSE in question, wherein the second one or more charging profiles are such that a sum of the respective maximum amounts of charging resources defined by the charging profiles that are effective for the EVSEs the communication connection of which is intact and the respective maximum amounts of charging resources defined by the respective default charging profiles for the one or more EVSEs the communication connection of which is broken, is equal to or less than said capacity group maximum amount of charging resources.

12. A central control system for a plurality of EVSEs that comprises a non-transitory computer readable storage medium having computer readable program code embodied therewith, and a processor coupled to the computer readable storage medium, wherein responsive to executing the computer readable program code, the processor is configured to perform the method according to claim 8.

13. A control system for an electric vehicle supply equipment, EVSE, the control system comprising a non-transitory computer readable storage medium having computer readable program code embodied therewith, and a processor coupled to the computer readable storage medium, wherein responsive to executing the computer readable program code, the processor is configured to perform the method according to claim 1.

14. A non-transitory computer-readable storage medium having stored thereon a computer program comprising instructions which, when the program is executed by a control system of an EVSE, cause the control system to perform the method according to claim 8.

15. A method for providing charging resources to one or more electric vehicles, the method comprising
- a control system of an electric vehicle supply equipment, EVSE, storing a default charging profile, the default charging profile defining a first maximum amount of charging resources that the EVSE may provide to one or more of said electric vehicles charging with the EVSE,
- the control system of the EVSE receiving from a central control system, via a communication connection between the control system and the central control system, a first charging profile, the first charging profile defining a second maximum amount of charging resources that the EVSE may provide to one or more of said electric vehicles charging with the EVSE,
- the control system effectuating the received charging profile comprising causing the EVSE to provide at most the second maximum amount of charging resources to one or more of said electric vehicles charging with the EVSE,
- the control system determining that the communication connection between the control system and the central control system is broken,
- based on this determination, the control system effectuating the default charging profile comprising causing the EVSE to provide at most the first maximum amount of charging resources to the one or more electric vehicles charging with the EVSE,
- each of a plurality of control systems of a plurality of respective EVSEs storing a respective default charging profile, the plurality of EVSEs forming a capacity group of EVSEs associated with a capacity group maximum amount of charging resources, the capacity group maximum amount defining a maximum amount of charging resources that can be provided to the capacity group, wherein each default charging profile defines for its associated EVSE an associated respective maximum amount of charging resources that the EVSE in question may provide to one or more of said electric vehicles charging with the EVSE in question, each default charging profile defines a time course of its associated maximum amount of charging resources during a time period, and
- each of one or more of the plurality of control systems determining that a communication connection between itself and the central control system is broken, and, based on this determination, the control system in question effectuating its stored default charging profile comprising causing its EVSE to provide at most the maximum amount of charging resources, as defined by the default charging profile stored by the control system in question, to the one or more electric vehicles charging with the EVSE in question, wherein
- each of said one or more control systems effectuating its stored default charging profile comprises causing the EVSE controlled by the control system in question to provide at any given time at most the maximum amount of charging resources as defined for that given time by the default charging profile stored by the control system in question, and
- the respective maximum amounts are defined by the respective default charging profiles as being that for any given time during said time period, a sum of the respective amounts defined for that given time by the respective default charging profiles is equal to or less than said capacity group maximum amount.

16. The method according to claim 15, wherein for any given time during said time period, the sum of the respective amounts defined for that given time by the respective default charging profiles is equivalent to said capacity group maximum amount.

* * * * *